(12) United States Patent
Hirzel

(10) Patent No.: US 7,230,361 B2
(45) Date of Patent: Jun. 12, 2007

(54) EFFICIENT HIGH-SPEED ELECTRIC DEVICE USING LOW-LOSS MATERIALS

(75) Inventor: Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 0 days.

(21) Appl. No.: 11/440,759

(22) Filed: May 25, 2006

(65) Prior Publication Data

US 2006/0208606 A1    Sep. 21, 2006

Related U.S. Application Data

(63) Continuation-in-part of application No. 10/769,094, filed on Jan. 30, 2004, now Pat. No. 7,067,950.

(60) Provisional application No. 60/444,271, filed on Jan. 31, 2003, provisional application No. 60/513,892, filed on Oct. 21, 2003.

(51) Int. Cl.
*H02K 1/00* (2006.01)
*H02K 1/12* (2006.01)

(52) U.S. Cl. ................. 310/216; 310/254

(58) Field of Classification Search ......... 310/216, 310/254, 120, 261, 269; 420/8, 528
See application file for complete search history.

(56) References Cited

U.S. PATENT DOCUMENTS

| | | | |
|---|---|---|---|
| 4,187,441 A | 2/1980 | Oney | 310/112 |
| 4,394,597 A | 7/1983 | Mas | 310/628 |
| 4,427,462 A | 1/1984 | Senno et al. | 148/308 |
| 4,578,610 A | 3/1986 | Kliman et al. | 310/156.35 |
| 5,731,649 A | 3/1998 | Caamano | 310/216 |
| 5,814,914 A | 9/1998 | Caamano | 310/216 |
| 5,903,082 A | 5/1999 | Caamano | 310/254 |
| 5,982,070 A | 11/1999 | Caamano | 310/216 |
| 5,986,378 A | 11/1999 | Caamano | 310/216 |
| 6,049,197 A | 4/2000 | Caamano | 322/89 |
| 6,154,013 A | 11/2000 | Caamano | 322/89 |
| 6,259,233 B1 | 7/2001 | Caamano | 322/89 |
| 6,407,466 B2 | 6/2002 | Caamano | 290/52 |
| 6,420,813 B1 | 7/2002 | DeCristofaro et al. | 310/216 |
| 6,462,456 B1 | 10/2002 | DeCristofaro et al. | 310/216 |
| 6,603,237 B1 | 8/2003 | Caamano | 310/254 |
| 6,784,588 B2 | 8/2004 | DeCristofaro et al. | 310/216 |
| 6,803,694 B2 | 10/2004 | DeCristofaro et al. | 310/216 |

(Continued)

OTHER PUBLICATIONS

Jacek F. Gieras, *Preformance Analysis of a Coreless Permanent Magnet Brushless Motor*, Jul. 2002, IEEE, USA.

(Continued)

*Primary Examiner*—Julio C. Gonzalez
(74) *Attorney, Agent, or Firm*—Ernest D. Buff & Associates LLC; Ernest D. Buff

(57) ABSTRACT

The invention relates generally to an electric device, such as an electric motor, a generator, or a regenerative motor, having a wound stator core made from advanced low-loss material. In preferred embodiments, the electric device is an axial airgap-type configuration. The invention provides an electric device having a high pole count that operates at high commutating frequencies, with high efficiency and high torque and power densities. Advanced low-loss materials exploited by the present invention include amorphous metals, nanocrystalline metals, and optimized Fe-based alloys.

43 Claims, 16 Drawing Sheets

U.S. PATENT DOCUMENTS

| | | | |
|---|---|---|---|
| 7,067,950 B2* | 6/2006 | Hirzel et al. | 310/216 |
| 2004/0212269 A1 | 10/2004 | DeCristofaro et al. | 310/216 |
| 2004/0251759 A1* | 12/2004 | Hirzel | 310/114 |
| 2005/0258705 A1* | 11/2005 | Berwald et al. | 310/216 |

OTHER PUBLICATIONS

Ronghai Qu and Thomas A. Lipo, *Potential of Amorphous Alloys for Application in Magnetic Devices*, No Date, Symposium on Applications for Magnetism.

Ronghai Qu and Thomas A. Lipo, *Dual-Rotor, Radial-Flux, Toroidally-Wound, Permanent-Magnet Machines*, 0-7803-7420-7/02 © 2002 IEEE.

Luborsky, Becker, Frischmann and Johnson, *Potential of Amorphous Alloys for Application in Magnetic Devices*, No Date, Symposium on Applications for Magnetism, General Electric Research and Development Center, Schenectady, NY, 12301.

Jacek F. Gieras, *Preformance Analysis of a Coreless Permanent Magnet Brushless Motor*, Jul. 2002, IEEE, USA.

* cited by examiner

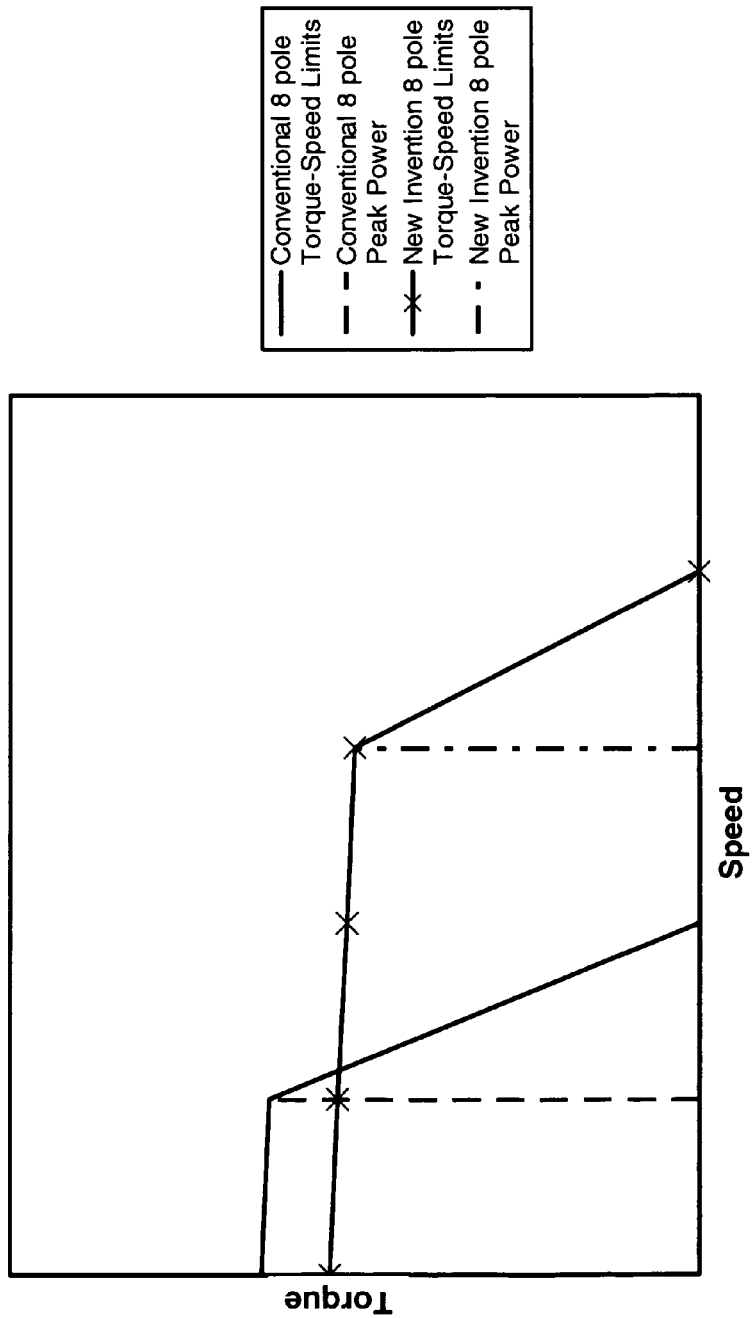

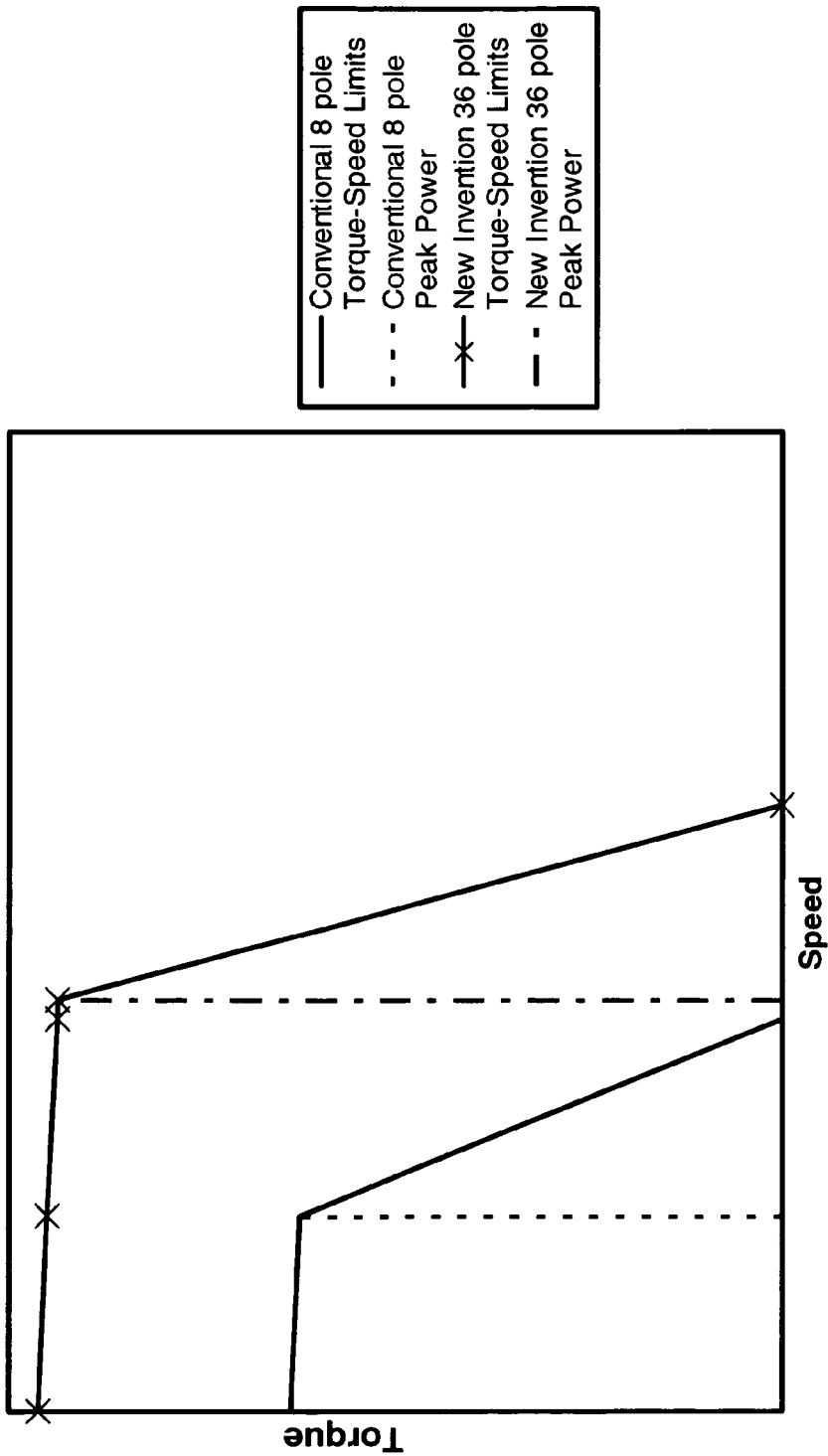

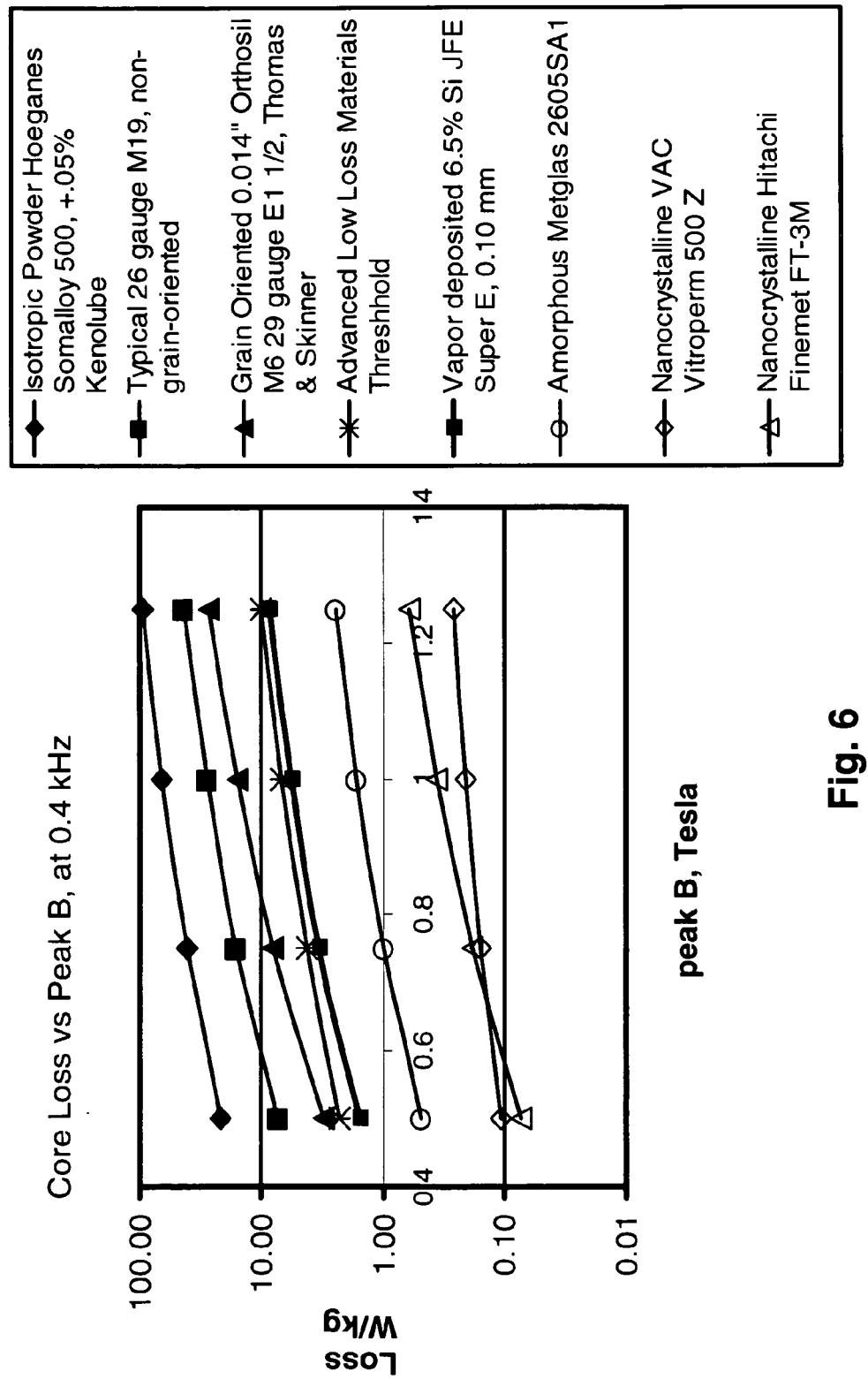

EFFICIENT HIGH-SPEED ELECTRIC DEVICE USING LOW-LOSS MATERIALS

CROSS-REFERENCE TO RELATED APPLICATIONS

This application is a continuation-in-part of U.S. patent application Ser. No. 10/769,094, filed Jan. 30, 2004, now U.S. Pat. No. 7,067,950 and further claims the benefit of U.S. Provisional Patent Application Ser. Nos. 60/444,271 and 60/513,892, filed Jan. 31, 2003 and Oct. 21, 2003, respectively, each of which application is hereby incorporated herein in its entirety by reference thereto.

BACKGROUND OF THE INVENTION

1. Field of the Invention

The invention relates to an electric device; and more particularly, to a rotating dynamoelectric machine capable of operating at high commutating frequencies, with high efficiency and high power and torque densities.

2. Description of the Prior Art

The electric motor and generator industry is continuously searching for ways to provide motors and generators with increased efficiencies and power densities. The power of an electromagnetic device is related to the exciting frequency of the device (also sometimes known as the commutating or electrical frequency), such that an increase in the exciting frequency of the device increases the power. Thus, machines with higher exciting frequencies are often desired when increased power is desired. The synchronous frequency of a synchronous electric machine can be generally expressed as $f = N \cdot P/2$, where f is the exciting frequency of the machine in Hz, N is the speed in revolutions per second, and P is the pole count of the machine. From this, it is seen that as the speed of the machine increases, the frequency increases, and the power increases. Likewise, as the pole count increases, the exciting frequency required to attain the same rotational speed increases. However, as the pole count increases, the time rate of change in the magnetic flux in the components of the machine for a given rotational speed also increases, leading to production of waste heat from increased core loss. A substantial fraction of the internally generated heat in conventional devices is core loss, arising principally from hysteresis in the soft magnetic material used in the stator, although magnetic losses also occur in the rotor magnets and other conductive elements exposed to a changing magnetic field.

Past attempts to manufacture high frequency electric machines (i.e., electric machines with a frequency greater than 400 Hz) typically involved low pole counts at high speeds to keep losses within acceptable limits. The vast majority of today's machines use conventional silicon-iron alloy (Si—Fe) containing about 3½% or less by weight of silicon. In particular, losses resulting from the changing magnetic fields at frequencies greater than about 400 Hz in conventional Si—Fe-based materials cause the material to heat to the point where the device cannot be cooled by any acceptable means. Machines using high frequency excitation to attain high power have thus been regarded heretofore as virtually impossible to construct and hence not commercially viable. Nevertheless, there remains a continuing desire for dynamoelectric machines that operate at high exciting frequencies, while yet providing a combination of high efficiency and high power density without any need for elaborate cooling schemes.

The development of amorphous metals and other advanced magnetic materials has caused many to believe that motors and generators made with magnetic cores of these materials potentially could provide substantially higher efficiencies and power densities than those available in conventional motors and generators. In particular, amorphous metals exhibit promising low-loss characteristics, suggesting that a stator made with a magnetic core of amorphous metal theoretically might result in an electric machine with increased efficiencies. However, previous attempts at incorporating amorphous material into conventional machines have not been commercially successful, because most simply involved substituting amorphous material for the silicon-iron in conventional magnetic cores of lower frequency electric machines. While some of these electric machines provide modestly increased efficiencies and lower losses, the lower saturation induction (flux density) of the amorphous metal deleteriously reduces power output. Moreover, the unique mechanical properties of amorphous metal make it significantly more difficult, if not impossible, to process using the techniques ordinarily employed in constructing conventional machines. Based on the unacceptably high handling and forming costs that would be incurred, it thus has not been deemed feasible to make this replacement.

For example, U.S. Pat. No. 4,578,610 discloses a highly efficient motor having a stator constructed by simply coiling a strip of amorphous metal tape, wherein the amorphous strip is wound and then slotted and a suitable stator winding is then placed within the slots.

U.S. Pat. No. 4,187,441 discloses a high power-density machine having spirally wound laminated magnetic cores made from amorphous metal ribbon having slots for receiving stator windings. The patent further discloses using a laser beam for cutting the slots into the amorphous core.

Notwithstanding significant study surrounding the use of amorphous metals in electric machines, to date it has proven very difficult to cost effectively provide a readily manufacturable electric device, which takes advantage of low loss materials. Many have abandoned attempts to develop a commercially viable electric machine having a magnetic core of amorphous metal. Thus it would be desirable to provide a highly efficient electric device, which takes full advantage of the specific characteristics associated with low loss material, thus eliminating the disadvantages associated with the prior art.

SUMMARY OF THE INVENTION

The present invention relates generally to a rotating, dynamoelectric device, including, but not limited to, an electric motor, a generator, or a regenerative motor (collectively referred to herein as "electric devices", "electromagnetic devices", "electric machines", etc.). The term regenerative motor is used herein to refer to a device that may be operated as either an electric motor or a generator. In some implementations, the electric device is a component in a composite device. An example of such a composite device is a compressor comprising one or more electric motors that are integrally connected to at least one fan. Preferably, the present invention relates to a highly efficient electric device having improved characteristics. More preferably, the present invention relates to a highly efficient electric device capable of operating at high frequencies.

Rotating machines, including the present device, ordinarily comprise a stationary component known as a stator and a concentrically disposed, rotating component known as a rotor. Adjacent faces of the rotor and stator are separated by a small airgap traversed by magnetic flux linking the rotor and stator. It will be understood by those skilled in the art that a rotating machine may comprise plural, mechanically connected rotors and/or plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis. The principles of the present invention are applicable to devices of both types, as well as to other machine types, such as the configurations delineated by commonly owned U.S. patent application Ser. No. 10/864,040, filed Jun. 9, 2004 and entitled "Radial Airgap, Transverse Flux Motor." This application is incorporated herein in its entirety by reference thereto. Except for certain specialized types, motors and generators generally employ soft magnetic materials of one or more types. By "soft magnetic material" is meant a ferromagnetic material that is easily and efficiently magnetized and demagnetized. The energy that is inevitably dissipated in a magnetic material during each magnetization cycle is termed hysteresis loss or core loss. The magnitude of hysteresis loss is a function both of the exciting amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of machine, the permanent and soft magnetic materials may be disposed either on the rotor or stator.

By far, the preponderance of dynamoelectric machines currently produced use as soft magnetic material various grades of electrical or motor steels, which are alloys of Fe with one or more alloying elements, especially including Si, P, C, and Al. Most commonly, Si is a predominant alloying element and the material is non-oriented. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type.

The stator assembly of the present device has a magnetic core made from low loss, high frequency material. Preferably, the stator's magnetic core is made of advanced, low core loss soft magnetic material. Representative examples of such material include certain amorphous metals, nanocrystalline metals, and optimized Fe-based alloys. The latter are crystalline materials that may be either grain-oriented or non-grain-oriented materials. Preferred, advanced, low-loss soft-magnetic materials are characterized by a core loss less than "L" where L is given by the formula $L=12 \cdot f \cdot B^{1.5} + 30 \cdot f^{2.3} \cdot B^{2.3}$, where L is the loss in W/kg, f is the frequency in KHz, and B is the peak magnetic flux density in Tesla. The use of one or more of these materials enables the device's excitation frequency to be increased above 400 Hz with only a relatively small increase in core loss, as compared to the large increase exhibited in conventional machines. The resulting device is highly efficient and capable of providing increased power.

In an aspect, the invention provides a highly efficient electric device with a high pole count capable of providing increased power density, improved efficiency, and a more square torque-speed curve. A preferred embodiment of the present device employs an axial-airgap configuration comprising at least one stator assembly including a unitary magnetic core having a number of slots. The slots are wound with stator windings. The electromagnetic device also includes at least one rotor assembly including a plurality of rotor poles. The rotor assembly is arranged and disposed for magnetic interaction with the at least one stator. The electromagnetic device is preferably capable of operating continuously under excitation at frequencies higher than 400 Hz.

BRIEF DESCRIPTION OF THE DRAWINGS

The invention will be more fully understood and further advantages will become apparent when reference is had to the following detailed description of the preferred embodiments of the invention and the accompanying drawings, wherein like reference numerals denote similar elements throughout the several views and in which:

FIGS. 5A and 5B are graphs depicting a torque vs. speed curve, comparing the performance of a conventional motor to a motor of the invention;

FIG. 6 is a graph depicting the core loss of various soft magnetic materials vs. the magnetic flux density, at 0.4 kHz;

DETAILED DESCRIPTION OF THE INVENTION

Figure 1A:
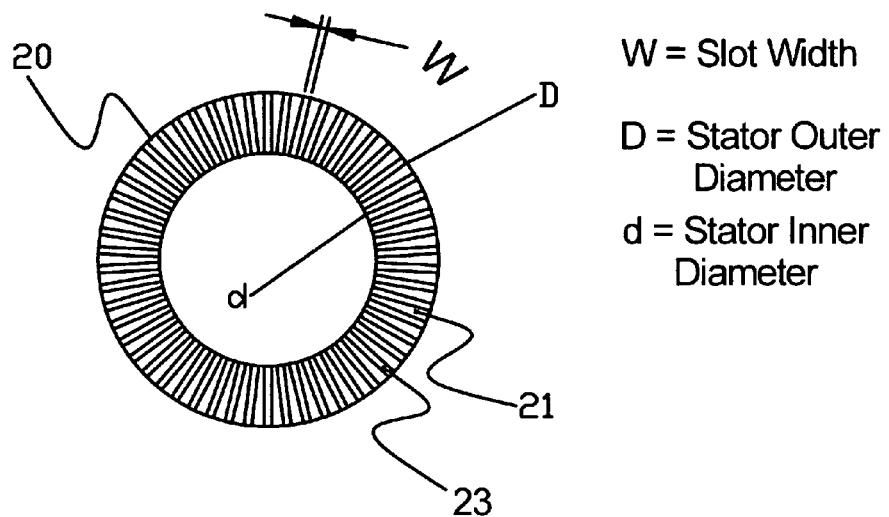
FIGS. 1A and 1B respectively depict in plan and side views a stator structure of the invention.

Preferred embodiments of the present invention will be explained in greater detail hereinafter, with reference to the accompanying drawings. Aspects of the present invention involve the design and/or manufacture an electric device, such as a brushless motor, having a wound stator core made from low-loss material. Preferably the stator core is comprised of at least one advanced, low-loss magnetic material selected from the group of materials consisting of amorphous metals, nanocrystalline metals, and optimized Fe-based alloys, which include both grain-oriented and non-grain-oriented materials. The following paragraphs provide examples of these advanced low-loss magnetic materials and a short discussion concerning each example. A common definition for such advanced low-loss materials follows.

Advanced Low-Loss Materials

The incorporation of amorphous, nanocrystalline, or optimized Fe-based materials in the preferred electrical device enables the machine's frequency to be increased above typical line frequencies (50–60 Hz) to values as high as 400 Hz or more with only a relatively small increase in core loss, as compared to the large increase exhibited in conventional machines using conventional magnetic core materials, such as commercial Si—Fe alloys. The use of the low-loss materials in the stator core allows the development of the high-frequency, high pole count, electric devices capable of providing increased power density, improved efficiency, and a more square torque-speed curve. Preferably the stator assembly comprises at least one material selected from the group consisting of amorphous, nanocrystalline, or optimized Fe-based alloy.

Amorphous Metals

Amorphous metals, also known as metallic glasses, exist in many different compositions suitable for use in the present device. Metallic glasses are typically formed from an alloy melt of the requisite composition that is quenched rapidly from the melt, e.g. by cooling at a rate of at least about $10^{6°}$ C./s. They exhibit no long-range atomic order and have X-ray diffraction patterns that show only diffuse halos, similar to those observed for inorganic oxide glasses. A number of compositions having suitable magnetic properties are set forth in U.S. Pat. No. RE32,925 to Chen et al. Amorphous metal is typically supplied in the form of extended lengths of thin ribbon (e.g. a thickness of at most about 50 µm) in widths of 20 cm or more. A process useful for the formation of metallic glass strips of indefinite length is disclosed by U.S. Pat. No. 4,142,571 to Narasimhan. An exemplary amorphous metal material suitable for use in the present invention is METGLAS® 2605 SA1, sold by Metglas, Inc., Conway, S.C. in the form of ribbon of indefinite length and up to about 20 cm wide and 20–25 µm thick (see http://www.metglas.com/products/page5_1_2_4.htm). Other amorphous materials with the requisite properties may also be used.

Amorphous metals have a number of characteristics that must be taken into account in the manufacture and use of magnetic implements. Unlike most soft magnetic materials, amorphous metals (also known as metallic glasses) are quite thin and are hard and brittle, especially after the heat treatment typically used to optimize their soft magnetic properties. As a result, many of the mechanical operations ordinarily used to process conventional soft magnetic materials for dynamoelectric machines are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

Known amorphous metals also exhibit a lower saturation flux density than conventional Si—Fe alloys. Mere substitution of the lower flux density amorphous metal for conventional SiFe alloys results in a machine with reduced power density, so the configuration generally has to be altered. In addition, amorphous metals possess a lower thermal conductivity and coefficient of thermal transfer than for the conventional Si—Fe alloys. As thermal conductivity determines how readily heat can be conducted through a material from a warm location to a cool location, a lower value of thermal conductivity necessitates careful design of the machine to assure adequate removal of waste heat arising from core losses in the magnetic materials, ohmic losses in the windings, friction, windage, and other loss sources. Inadequate removal of waste heat, in turn, would cause the temperature of the machine to rise unacceptably. Excessive temperature is likely to cause premature failure of electrical insulation or other machine components. In some cases, the over-temperature could cause a shock hazard or trigger a catastrophic fire or other serious danger to health and safety.

Conventional Si—Fe alloys further exhibit a lower coefficient of magnetostriction than amorphous metals. A material with a lower coefficient of magnetostriction undergoes smaller dimensional change under the influence of a magnet field, which in turn would tend to result in a quieter machine.

Despite these challenges, an aspect of the present invention provides a device that successfully incorporates advanced soft magnetic materials, and permits operation with high frequency excitation, e.g., a commutating frequency greater than about 400 Hz. Construction techniques for the fabrication of the device are also provided. As a result of the configuration and the use of advanced materials, especially amorphous metals, the present device is successfully operable at high frequencies (defined as commutating frequencies greater than about 400 Hz), and with a high pole count. The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 µm thick or more. Both these characteristics promote lower eddy current core losses. The invention successfully provides a machine that benefits from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with grain sizes of about 100 nanometers or less. The attributes of nanocrystalline metals as compared to conventional coarse-grained metals include increased strength and hardness, enhanced diffusivity, improved ductility and toughness, reduced density, reduced modulus, higher electrical resistance, increased specific heat, higher thermal expansion coefficients, lower thermal conductivity, superior soft magnetic properties, including lower core loss.

Nanocrystalline metals may be formed by a number of techniques. One preferred method comprises initially casting the requisite composition as an amorphous metal ribbon of indefinite length, using techniques such as those provided hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Preferably, the nanocrystalline metal is an iron-based material. However, the nanocrystalline metal could also be based on or include other ferromagnetic materials, such as cobalt or nickel. Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals, Vacuumschmelze GmbH, and Alps Electric. An exemplary nanocrystalline metal with low-loss properties is Hitachi Finemet FT-3M. Another exemplary nanocrystalline metal with low-loss properties is Vacuumschmelze Vitroperm 500 Z.

Optimized Fe-Based Alloys

The present machine may also be constructed with optimized, low-loss Fe-based crystalline alloy material. Preferably such material has the form of strip having a thickness of less than about 125 μm, much thinner than the steels conventionally used in machines, which have thicknesses of 200 μm or more, and sometimes as much as 400 μm or more. Both grain-oriented and non-oriented materials may be used. As used herein, the term "oriented material" denotes one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain orientation is typically obtained by suitable thermomechanical processing by methods known in the art, most commonly including rolling. The magnetization of the grains and magnetic domains are thereby oriented in the direction of the rolling process. This domain orientation allows the internal magnetization to be more readily reversible in the direction of orientation, yielding lower core losses in that preferred direction. However, the core losses increase in the direction orthogonal to the preferred orientation, and could prove to be a disadvantage in electric device applications. If used in the present machine, grain-oriented material is preferably disposed with its easy direction of magnetization substantially coincident with the predominant direction of magnetic flux.

In a "non-oriented material," the grains do not have the aforementioned crystallographic ordering of the constituent grains. Therefore, non-oriented material does not need to be disposed in any particular direction with respect to magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional Si—Fe may be as much as 10 times those of suitable amorphous metal at the frequencies and flux levels at which the present machines satisfactorily operate. As a result, in many embodiments conventional material under high frequency operation would heat to a point at which a conventional machine could not be cooled by any acceptable means. However, some grades of silicon-iron alloys, herein referred to as optimized Si—Fe, have suitably low loss and thus are directly applicable to producing a high-frequency machine.

The optimized Fe-based alloys useful in the practice of the present invention include silicon-iron alloy grades comprising greater than 3.5% of silicon by weight, and preferably more than 4%. The non-grain-oriented Fe-based material used in constructing machines in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, the alloys have about 6.5% Si and exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, lower core losses. These beneficial qualities are obtainable in certain alloys with increased silicon content made by suitable fabrication methods. In some cases, these optimized Fe-based alloys are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5Si alloy is supplied as magnetic strips 50 and 100 μm thick by the JFE Steel Corporation, Tokyo, Japan (see also http://www.jfe-steel.co.jp/en/products/electrical/supercore/index.html). Fe-6.5% Si produced by rapid solidification processing, as disclosed by U.S. Pat. No. 4,865,657 to Das et al. and U.S. Pat. No. 4,265,682 to Tsuya et al., also may be used. Rapid solidification processing is also known for preparing Sendust and related Fe—Si—Al alloys.

Loss Behavior of Preferred Soft Magnetic Materials

A major contribution to the improved loss behavior of the materials preferred for the present machine results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present machines. High losses, in turn, can contribute to the overheating of the core.

More specifically, it is found that the core loss of soft magnetic materials can generally be expressed by the following modified Steinmetz equation:

$$L = a \cdot f \cdot B^b + c \cdot f^d \cdot B^e \quad (1)$$

wherein:
L is the loss in W/kg,
f is the frequency in kHz,
B is the peak magnetic flux density in Tesla, and
a, b, c, d, and e are all empirical loss coefficients specific to any particular soft magnetic material.

As used herein, the term "advanced low loss materials" includes those materials characterized by a core loss less than "L" where L is given by the formula $L = 12 \cdot f \cdot B^{1.5} + 30 \cdot f^{2.3} \cdot B^{2.3}$, "L," "f," and "B" being as defined above.

FIGS. 6–11 provide graphs showing the core loss behavior (as defined by the equation $L = a \cdot f \cdot B^b + c \cdot f^d \cdot B^e$) of various soft magnetic materials versus either the magnetic flux density or the frequency, at various frequencies ranging from 0.4 kHz to 2.0 kHz and various magnetic flux densities ranging from 0.5 Tesla to 1.5 Tesla. The loss coefficients for each of the materials shown in FIGS. 6–11 are provided in Table I below. Also provided are loss coefficients defining advanced, low core loss material as discussed hereinbelow in greater detail.

As can be seen in FIGS. 6–11, a threshold line segment is plotted to show the loss equation that defines the loss threshold for "advanced low loss materials". Materials having a loss equation plotted above this threshold are not "advanced low loss materials". Materials having a loss equation plotted at or below this threshold are defined herein as "advanced low loss materials" or "advanced materials". As can be seen from FIGS. 6–11, the advanced low loss materials include, without limitation, amorphous metals, nanocrystalline alloys, and optimized Fe-based alloys. Other soft magnetic materials exhibiting similarly low losses under the operating conditions of the present device are also suitable. Preferably, the advanced, low loss soft magnetic materials used in the present machine have a saturation flux density of at least about 1.2 T, and more preferably, at least about 1.5 T. In the following paragraphs of disclosure a description of a highly efficient electromagnetic machine constructed from such advanced low-loss materials is provided. The plots provided in FIGS. 6–11 are shown for frequencies ranging from 0.4 kHz to 2.0 kHz and flux densities ranging from 0.5 Tesla to 1.5 Tesla because these are typical ranges for operation of the electric machines described herein. However, the electric machines described herein are not limited to operation in such ranges.

General Device Structure

The present invention provides an electric device which includes one or more stators and one or more magnetic field assemblies, such as rotors. The one or more stators are

TABLE I

Loss Coefficients Of Soft Magnetic Materials

| Loss Coeff. | Isotropic Powder, Hoeganes Somalloy 500, +.05% Kenolube | Typical 26 gauge M19, non-grain-oriented | Grain-oriented. 0.014" Orthosil M6 29 gauge EI ½, Thomas & Skinner | "Advanced Materials" Defined Loss Limit |
|---|---|---|---|---|
| a | 40.27 | 11.39 | 38.13 | 12.00 |
| b | 2.15 | 1.62 | 2.37 | 1.50 |
| c | 141.24 | 112.43 | 14.19 | 30.00 |
| d | 1.15 | 1.72 | 3.66 | 2.30 |
| e | 1.46 | 2.01 | 2.14 | 2.30 |

| Loss Coeff. | Vapor Deposited 6.5% Si, JFE Super E, 0.10 mm | Amorphous, Metglas 2605SA1, advertised literature | Nanocrystalline, VAC Vitroperm 500 Z | NanoCrystalline, Hitachi Finemet FT-3M |
|---|---|---|---|---|
| a | 10.77 | 0 | 0 | 0.00 |
| b | 1.85 | 0 | 0 | 0 |
| c | 7.83 | 6.5 | 0.84 | 1.05 |
| d | 1.93 | 1.51 | 1.5 | 1.15 |
| e | 1.85 | 1.74 | 1 | 2.32 |

Each of the above materials is a soft magnetic material comprised primarily of an iron based alloy. Each of the coefficients noted in the tables above are available from the manufacturers of the materials or may be derived from the material specifications available from the manufacturers of the materials; the coefficients are frequently included on the spec sheets for the materials. To this end, each manufacturer of soft magnetic materials will typically participate in industry standard ASTM testing procedures that produce material specifications from which the coefficients for the Steinmetz equations may be derived.

formed from advanced low-loss materials, such as amorphous metal, nanocrystalline metal, or optimized Fe-based alloy. The present dynamoelectric machine further includes a rotor assembly supported for rotation about an axis and being arranged concentrically with the stator assembly and disposed to interact magnetically with it. Both axial and radial airgap configurations are contemplated. The present machine may comprise one or more rotor assemblies and one or more stator assemblies. Accordingly, the terms "a rotor" and "a stator" as used herein with reference to electric machines mean a number of rotor and stator assemblies ranging from one to as many as three or more. In a preferred embodiment, the present machine has an axial airgap configuration. More preferably, the machine is an axial airgap, DC brushless device employing a disk-like rotor assembly comprising a plurality of circumferentially spaced-apart permanent magnets.

Figure 1B:
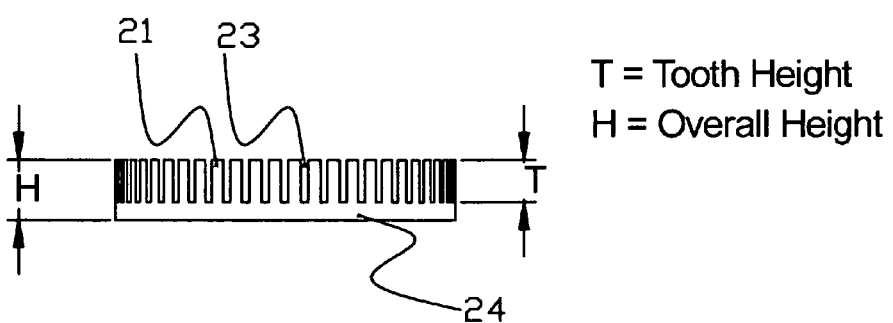

FIGS. 1A and 1B illustrate a top and side view, respectively, of a stator according to one embodiment of the invention. A ribbon of the advanced low-loss material is wound into a large toroid to form the stator metal core 20. These ribbons are typically 0.10 mm (0.004") or less in thickness. The toroid wound from the ribbon has an inside diameter and an outer diameter when viewed in the axial direction, which inside and outside diameters define a surface area known as the total area (TA). The metal core is then machined with slots 23 to form a unitary magnetic core of the stator (discussed in further detail below). The slots reduce the surface area of metal core.

FIG. 1A illustrates the inner diameter (d) and outer diameter (D) of the stator core 20 and also illustrates the slots 23 of outer width (W) that have been machined into the metal core 20 to form the stator. The surface area left after the removal of the slots is called the low-loss metal area. In preferred embodiments where the low-loss material is an amorphous metal, the low-loss metal area is also referred to as the amorphous metal area (AMA). The metal core has an inside circumference that defines inner diameter (d). The inside circumference is not continuous on the slotted portion. Instead, the inside circumference that traverses the slots has gaps where the slots are located. These slots are designed to hold stator windings. Each of the remaining portions of the core inside circumference (i.e., the individual extensions from the backiron 24) is called a tooth 21.

FIG. 1B shows the height (T) of the teeth 21 as it compares to the overall height (H) of the stator 20. The overall height includes the height of the backiron 24 plus the height of the teeth 21. There are equal numbers of teeth 21 and slots 23. In preferred embodiments, the narrowest part of a tooth is not less than 0.100 inch. The area that is removed when the stator is slotted can be filled with potting and/or varnish compounds, or thin organic insulation materials, along with the conducting stator winding, as is known in the art.

As mentioned previously, the stator core is comprised of advanced low loss material and is "unitary" in construction in one embodiment. As used herein, a stator core that is "unitary" in construction is one that is does not require the assembly of two or more subcomponents to complete the stator core. In addition, the unitary stator core disclosed herein is also a "uni-body" stator core. As used herein, the term "uni-body" (or "unibody") refers to a stator core that is layered from a thin ribbon of soft magnetic material to form a base shape and material is then removed from the base shape to form the stator core (e.g., the base shape is slotted to form teeth on the stator core). Unfortunately, advanced low loss materials tend to be extremely brittle, and making a uni-body stator core has proven to be difficult. Nevertheless, several companies, including some manufacturers of advanced low loss materials, have manufactured such stators made of advanced low loss materials using various processes, such as wire electro-discharge machining, laser cutting, and electrochemical and conventional grinding. One suitable construction technique is provided by commonly assigned U.S. Pat. No. 7,018,498, which is incorporated herein by reference thereto.

Although some of the stator cores described herein are of uni-body and unitary construction, various types of non-unitary and non-uni-body stator cores are contemplated for use in the present electric machines. For example, a "unibody" stator core is possible that is subsequently cut into segments, making the resulting stator core not "unitary". Likewise, a "unitary" stator core may be formed by molding an advanced material into the form of a stator core, including any teeth, but because the stator core is not wound from a thin ribbon to form a base shape with subsequent removal of material from the base shape, the resulting stator core would not be "uni-body".

The stator core in some implementations of the present device is assembled from plural subassemblies. For example, the 21 and toroidal backiron sections 24 of the axial stator 20 depicted by FIGS. 1A–1B might be formed separately and joined to provide the final conformation. The individual components are secured to provide mechanical integrity and maintain the relative positioning of the constituent components in the finished device.

The securing may comprise any combination of mechanical banding, clamping, adhesives, potting, or the like. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, and high dielectric strength. Epoxies may be either multi-part whose curing is chemically activated or single-part whose curing is activated thermally or by exposure to ultra-violet radiation. Preferably, the adhesive has a viscosity of less than 1000 cps and a thermal expansion coefficient approximately equal to that of the metal, or about 10 ppm.

Figure 2:
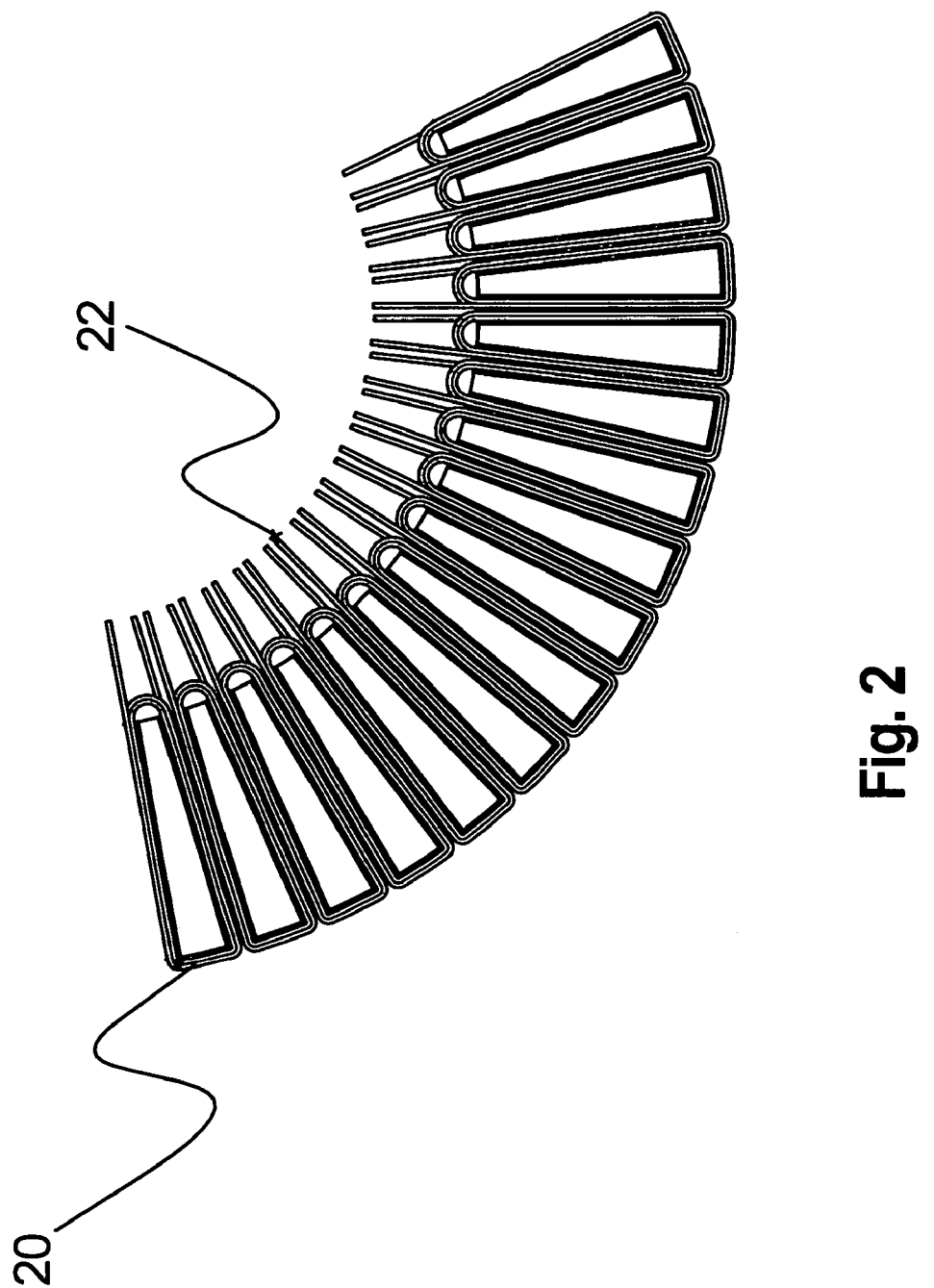
FIG. 2 depicts in plan view a stator structure including stator windings in accordance with the invention.

FIG. 2 illustrates a unitary, unibody stator core 20 that has been wound with stator windings 22. The stator 20 wound with stator windings 22 is placed into a toroidal housing and potted with an appropriate organic dielectric. It is possible to wire multiple, non-adjacent slots into a common magnetic section, which corresponds to a slot per phase per pole (SPP) value of about 0.5, where the SPP ratio is determined by dividing the number of slots in a stator core by the number of phases in the stator winding and the number of DC poles (SPP=slots/phases/poles). The slotted area which is not taken up by the windings, i.e., the potting, varnish and insulation material areas, is the waste area (WA). The difference between the total area and the waste area is called the useful area. In some preferred embodiments, in which SPP=0.5, it is found that allocating about 35%+/−10% of the useful space to conductive windings tends to optimize the power density (watts output per cubic centimeter) of the machine. This percentage value is given under the assumption of a constant fundamental frequency, and a constant ampere-turns applied to each stator tooth. With the same calculation, and under the same assumption, a different percentage of about 50%+/−10%, is found to optimize the torque density (torque per kg of active material).

Any appropriate material able to properly support the stator arrangement may be used for the toroidal housing. While the toroidal housing is preferably non-magnetic, there is no restriction on the conductivity of the toroidal housing material. Other factors can also influence the choice of toroidal housing material, such as a requirement of mechanical strength. In a specific embodiment, the toroidal housing is formed from aluminum.

Figure 3A:
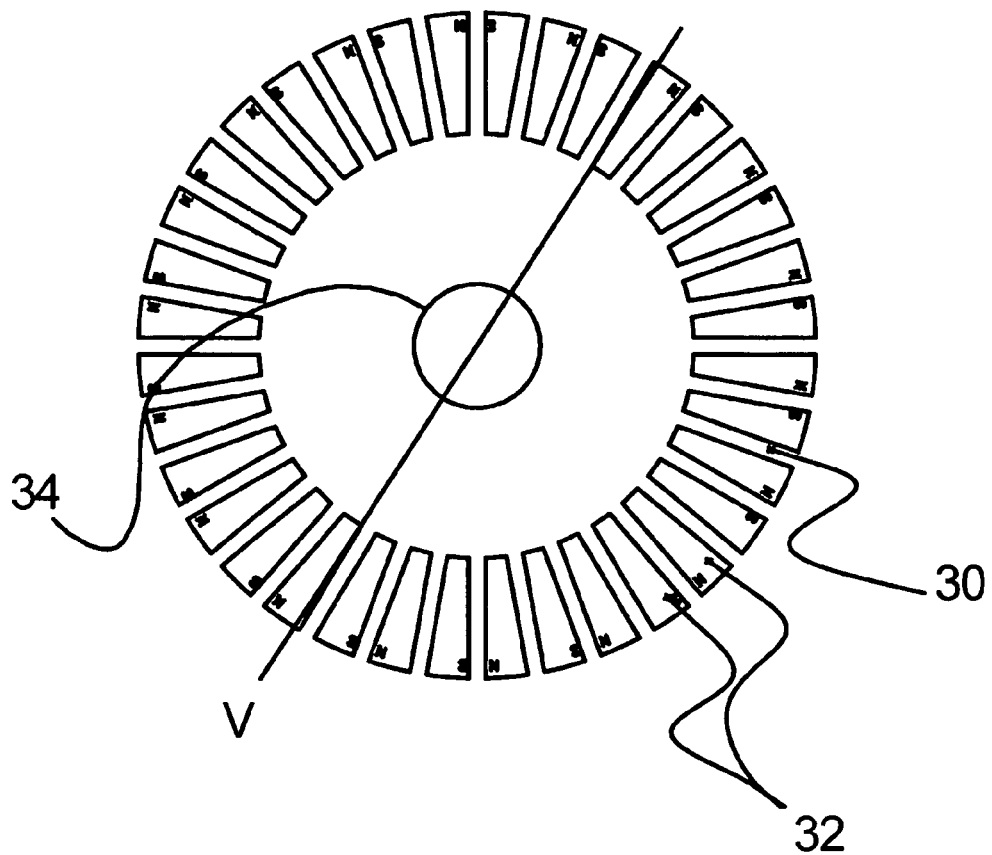
FIGS. 3A and 3B respectively depict in plan and side views a rotor structure of the invention, showing the location and polarity of magnets.
Figure 3B:
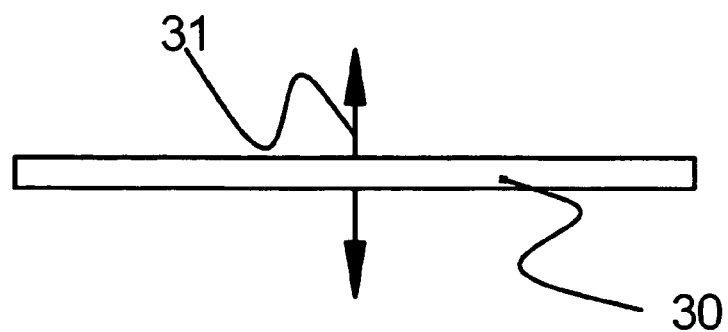

A magnetic field assembly is placed adjacent to the stator body arranged and disposed for magnetic interaction with the stator, as is common in the art. FIGS. 3A and 3B illustrate a top and side view, respectively, of a magnetic field assembly in the form of a rotor 30 for an axial airgap device. The rotor 30 is centered about a common axis 31 with the stator. FIG. 3A illustrates a plurality of magnets 32 possessing alternating polarity positioned about the rotor. In different embodiments, the positioning and polarity of the magnets 32 can vary, as desired for a motor design. In a preferred embodiment, the rotor comprises a plurality of permanent magnets. FIG. 3B illustrates a side view of the rotor taken along line A of FIG. 3A. In the embodiment of the rotor illustrated in FIG. 3B, the magnets 32 extend through the thickness of the rotor 30. In other embodiments, the magnets 32 do not extend through the thickness of the rotor 30. Preferably, the rotor arrangement is a disk or axial type rotor including circumferentially spaced apart, high energy product permanent magnets (e.g., rare earth magnets, such as cobalt rare earth magnets or NdFeB). The magnets have opposite ends defining north and south poles, thereby producing magnetic flux emanating generally perpendicular to the disk surface and toward the facing stator assembly. The magnets 32 are supported for rotation about the axis of a shaft (not shown) along the common axis 31 or any other suitable arrangement such that the poles of the magnets in alternating polarity are accessible along a predetermined path adjacent the stator arrangement. The magnet area of the rotor 30 has an outer diameter and an inner diameter, which forms an internal cavity 34, permitting the rotor to be attached, e.g. to a shaft, which may also be formed integrally with the rotor carrier structure In preferred embodiments involving an axial-type arrangement of the rotor and stator, the outer diameter and inner diameter of the rotor 30 are substantially identical to those of the stator 20. If the outer diameter of the rotor 30 is greater than that of the stator 20, then the outer portion of the rotor does not contribute to performance, while just adding weight and inertia. If the outer diameter of the rotor is smaller than that of the stator, the result is a reduction in performance.

In different embodiments, the magnets are mounted on or set into the rotor. The magnets can be spaced such that, circumferentially, there are no clearances between alternating magnets. It is preferable that the spacing between the magnets is kept to an optimum value, which minimizes the occurrence of torque cogging. Torque cogging is the variation in torque with position after input current is greatly reduced and while the shaft is at zero or very low rpm. Any machine with appreciable torque cogging may be subject to undesirable performance and acoustic problems. An optimum spacing is derived from first dividing the low-loss metal area of the stator 20 by the number of stator slots to get the area of each single metal core tooth. It has been found that the optimum spacing between the magnets will then be such that the total area of each magnet equals 175%+/−20% of the area of a core tooth.

Although the magnets have been described as permanent magnets, this is not a requirement. The magnets may be other types of magnetic materials, or, in other embodiments, may be electromagnets, induction machines, etc. Furthermore, although the device generally has been discussed in the context of a disk or axial-type embodiment, the electric device of the present invention is not limited to axial-type devices. Rather, it may take on a wide variety of configurations, such as a barrel or radial-type motor, with the rotor magnets being positioned on the outer circumference of the radial rotor. Furthermore, the number of magnets spaced across the rotor arrangement may also vary while still falling within the scope of the present invention.

Figure 4:
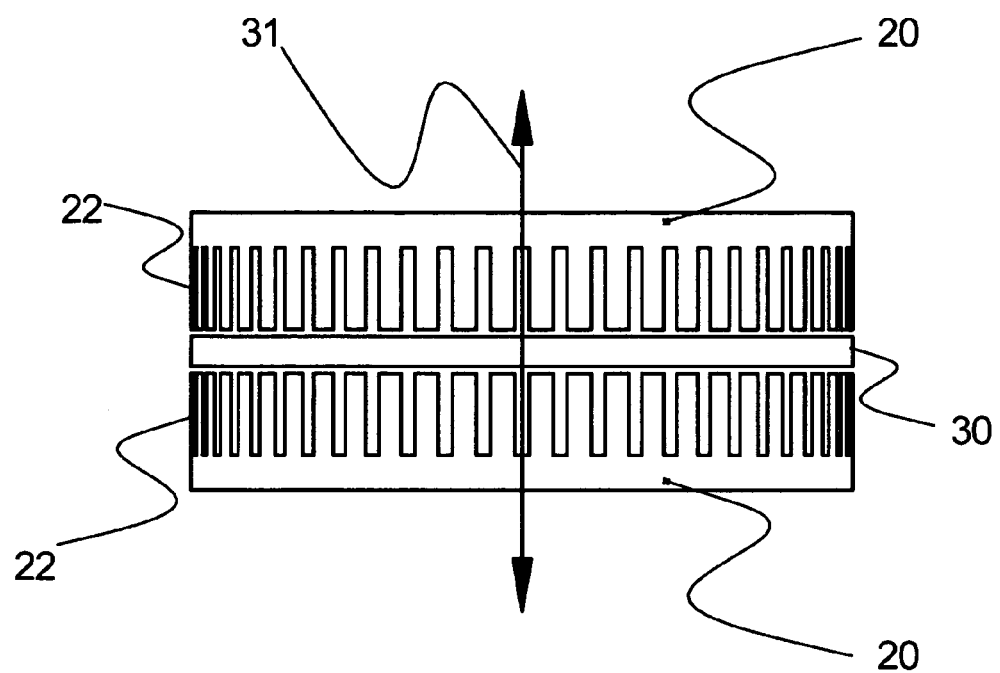
FIG. 4 depicts in plan view a stator/rotor arrangement for an axial airgap-type motor geometry of the invention.
Figure 7:
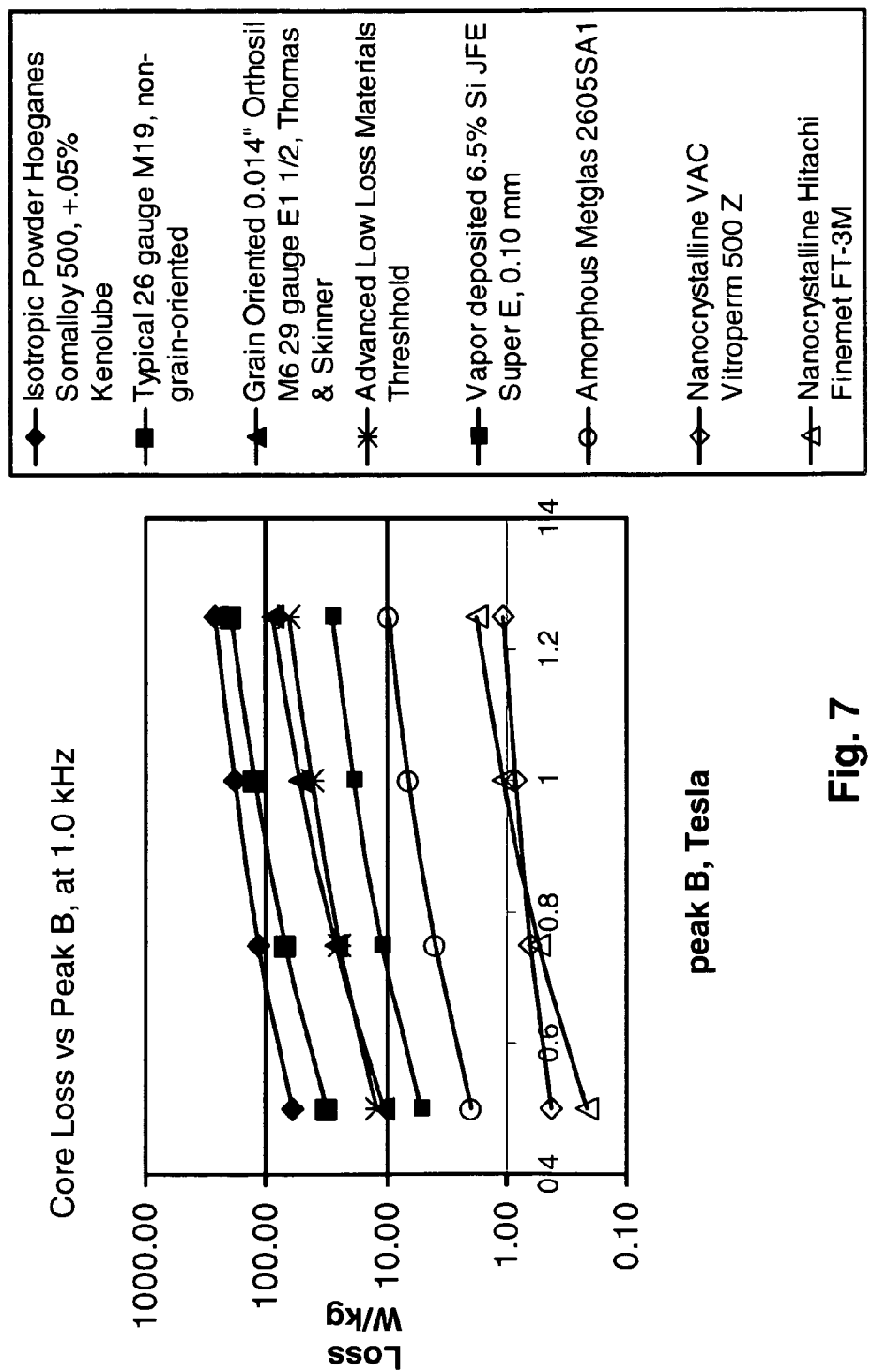
FIG. 7 is a graph depicting the core loss of various soft magnetic materials vs. the magnetic flux density, at 1.0 kHz.
Figure 8:
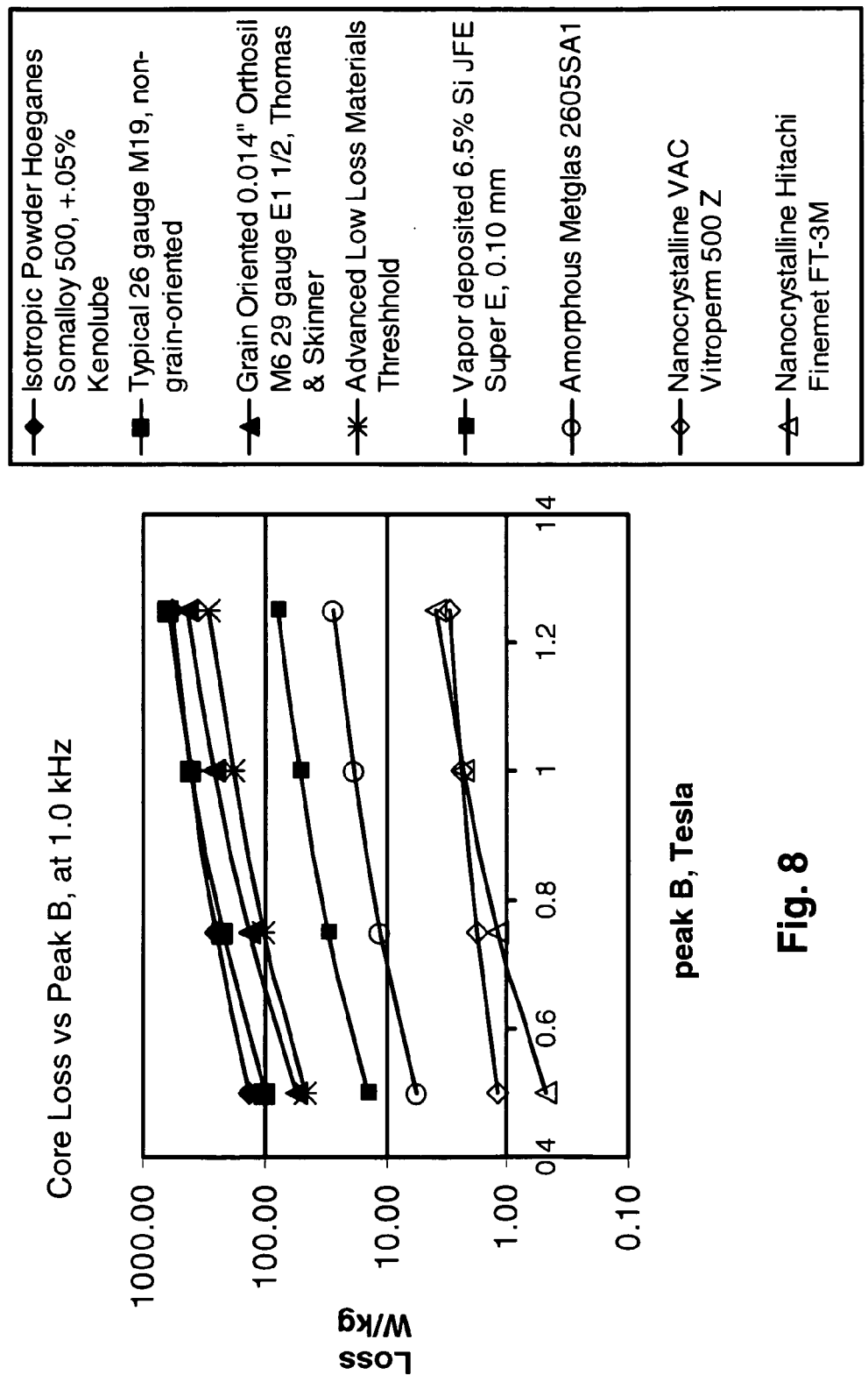
FIG. 8 is a graph depicting the core loss of various soft magnetic materials vs. the magnetic flux density, at 2.0 kHz.
Figure 9:
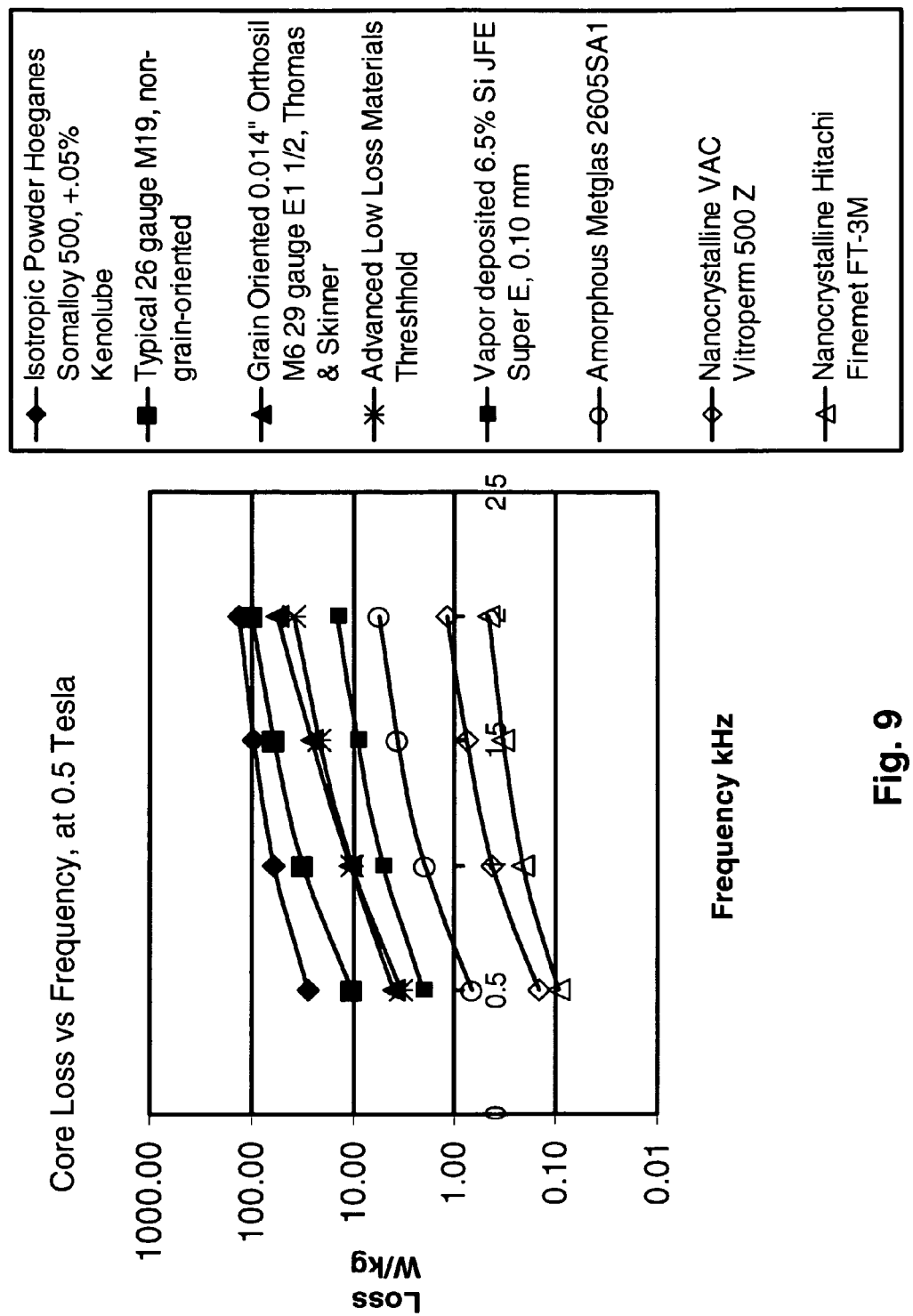
FIG. 9 is a graph depicting the core loss of various soft magnetic materials vs. frequency, at a magnetic flux density of 0.5 T.
Figure 10:
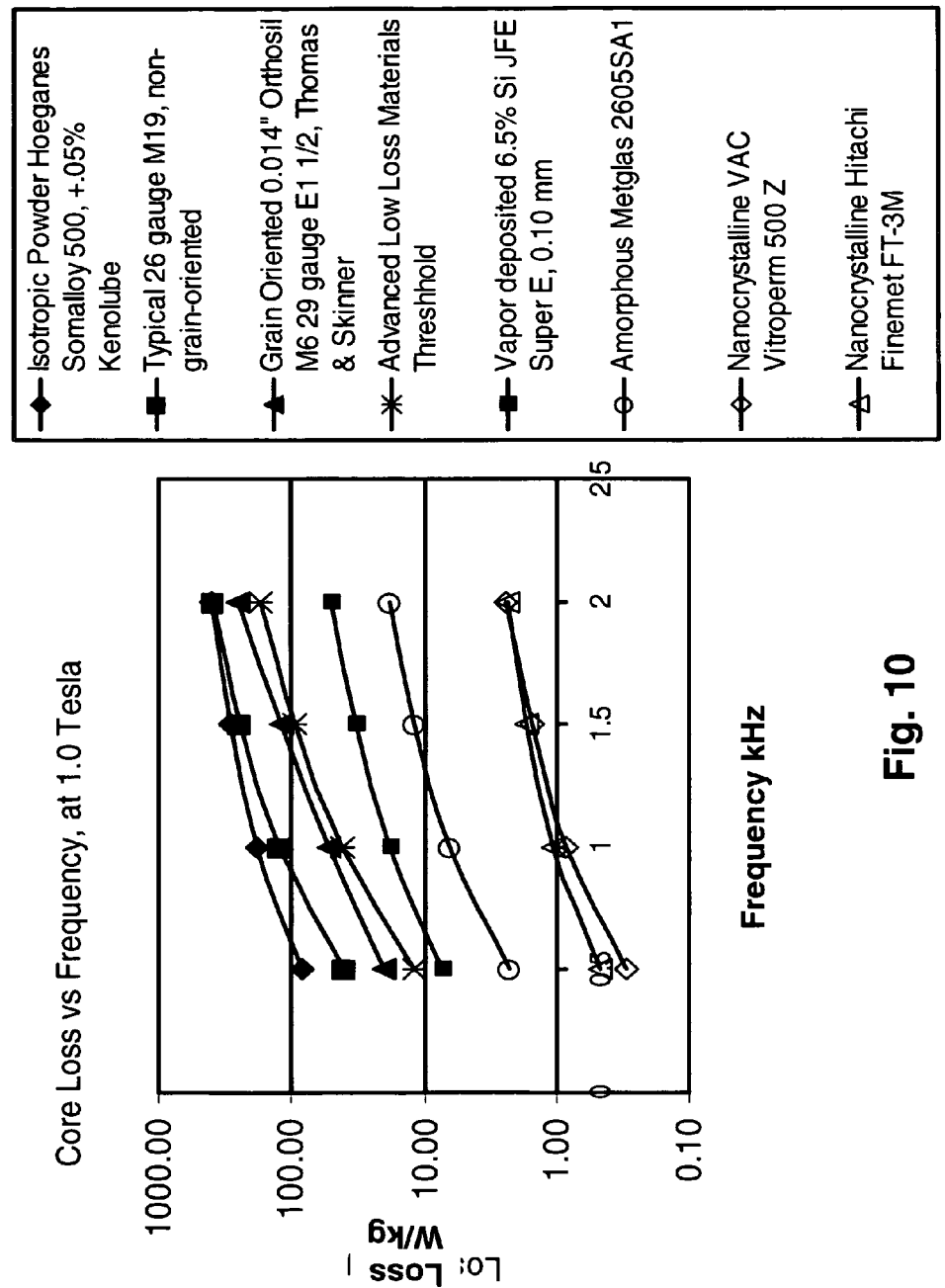
FIG. 10 is a graph depicting the core loss of various soft magnetic materials vs. frequency, at a magnetic flux density of 1.0 tesla.
Figure 11:
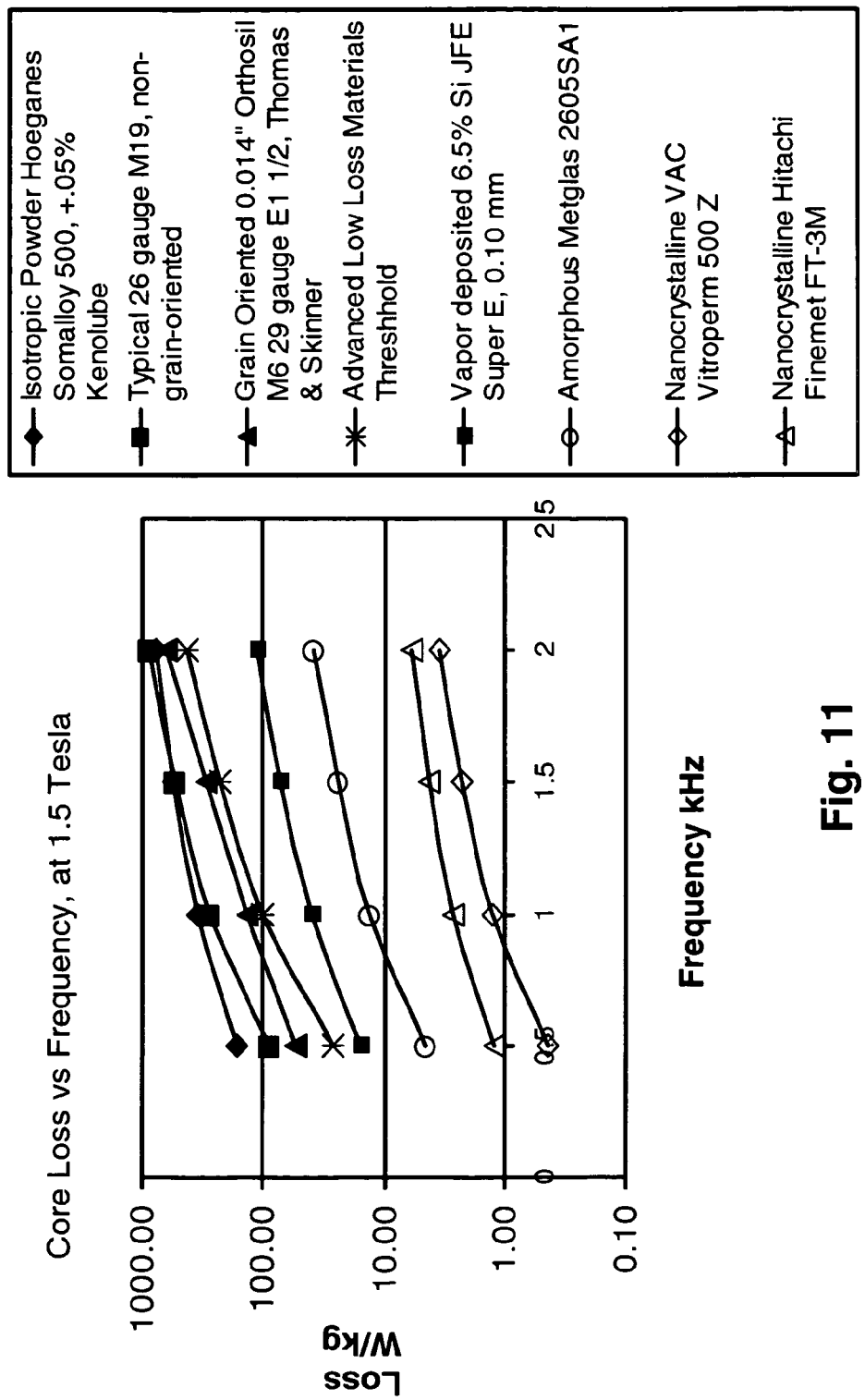
FIG. 11 is a graph depicting the core loss of various soft magnetic materials vs. frequency, at a magnetic flux density of 1.5 tesla.

FIG. 4 illustrates a side view of an embodiment of the electric device which includes two stators 20 positioned in an axial-type arrangement on either side of, and along a common center 31 with a single rotor 30, which serves both stators 20. Rotor 30 preferably includes a plurality of circumferentially disposed permanent magnets providing rotor poles for interaction with both stators. Windings 22 are wound on the stators 20. In a specific embodiment, an electric device including stator cores comprised of Metglas® alloy on either side of a single rotor is found to exhibit a high power density. Variations of the design, including selection of the dimensions of individual components or even the absence of a given component in accordance with the design principles delineated herein, will be apparent to one of ordinary skill in the art, while still falling within the scope of the present invention.

The FIG. 4 embodiment includes two stator cores and one rotor arrangement therebetween. However, it should be noted that the electric device of the present invention also permits stacking as many additional alternating stator and rotor arrangements as necessary to meet the requirements of the intended application. The stator housings are typically mirror images of one another, therefore only one stator core has been described in detail.

Figure 15:
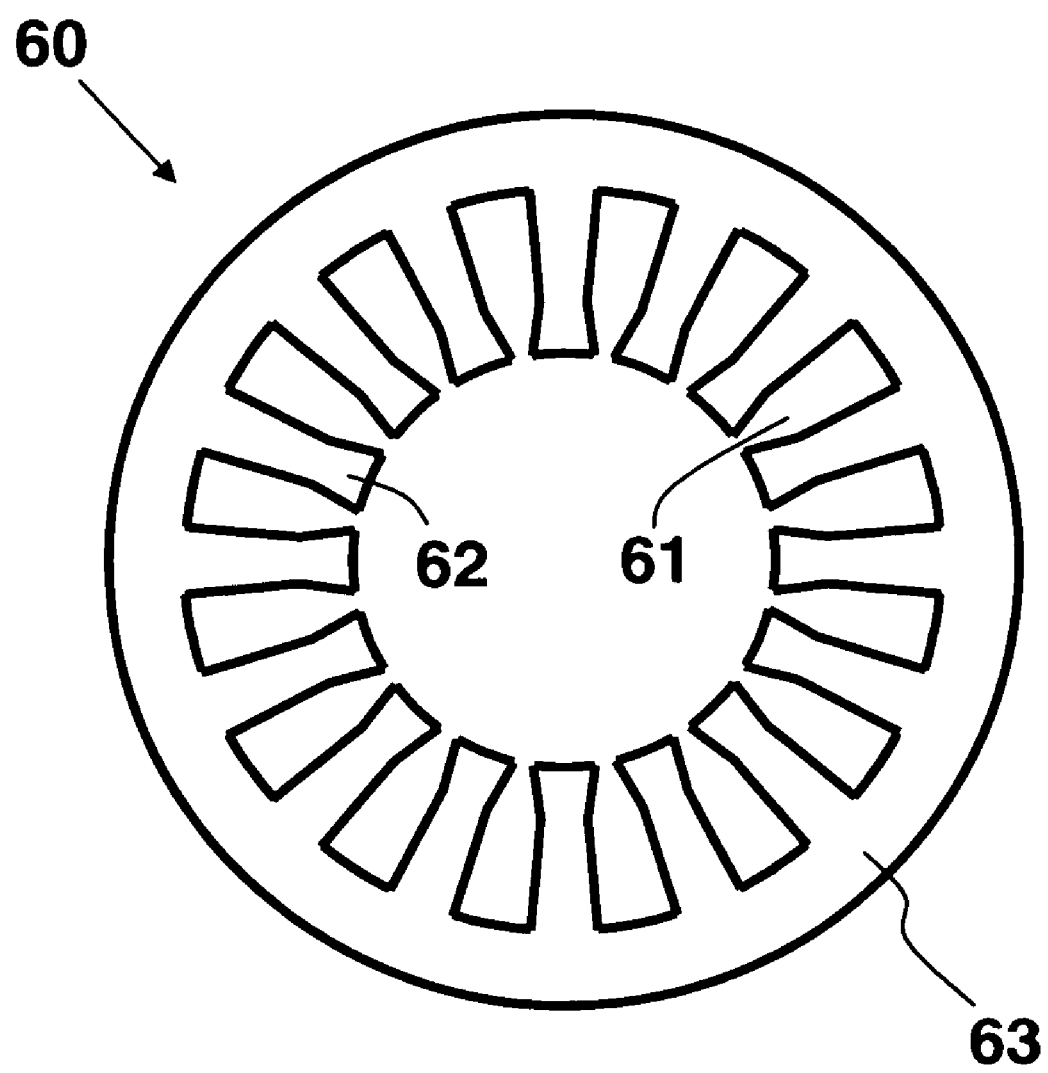
FIG. 15 is a plan view of a stator shape suitable for use in a radial airgap machine of the invention.

Other configurations are also suitable for the present machine. For example, FIG. 15 depicts a stator 60 with slots 61 and teeth 62 extending radially inward from a backiron 63. Such a stator is typically formed by laminating in stacked registry a plurality of thin, planar laminations of advanced, low loss soft magnetic material. A radial airgap embodiment of the present machine might employ a stator with 16 teeth and slots as shown and associated stator windings (not shown). Such a stator might be used with a suitably configured 12-magnet rotor to produce a four-phase, radial airgap device. Radial flux embodiments of the present device may be constructed with other numbers of slots and phases as well.

In another aspect of the present invention there is provided a dynamoelectric machine system that includes a high efficiency dynamoelectric machine designed in accordance with the principles set forth herein and power electronics means operably connected to the machine. For motoring applications, the machine is interfaced through the power electronics means to an electrical source, such as the electrical power grid, electrochemical batteries, fuel cells, solar cells, or any other suitable source of electrical energy. A mechanical load of any requisite type may be connected to the machine shaft.

Motoring machines must be supplied with AC power, either directly or by commutation of DC power. Although mechanical commutation has long been used with brush-type machines, the availability of high-power semiconductor devices has enabled the design of power electronics means that includes the circuitry to provide electronic commutation. Many modern permanent magnet motors thus avoid the need for brushes and mechanical commutation.

In generating mode, the machine shaft is mechanically connected to a prime mover, which may be any source of rotational mechanical energy. The system is further connected through the power electronics means to an electrical load, which may include any form of electrical appliance or electrical energy storage. The machine system may also be employed as regenerative motor system, for example as a system connected to the drive wheels of a vehicle, alternately providing mechanical propulsion to the vehicle and converting the vehicle's kinetic energy back to electrical energy stored in a battery or the like to effect braking.

A large number of motoring and generating machines are said to operate synchronously, by which is meant that the AC input or output power has a frequency commensurate with the rotational frequency and the number of poles. Synchronous motors directly connected to a power grid, e.g. the 50 or 60 Hz grid commonly provided by electric utilities or the 400 Hz grid often used in shipboard and aerospace systems, therefore operate at particular speeds, with variations in the synchronous speed obtainable only by changing pole count. For synchronous generation, the rotational speed of the prime mover typically must be controlled to provide a stable, commensurate output frequency. Some prime movers inherently provide a rotational speed that is too high or low to be accommodated by machines that have pole counts within practical limits for known designs. In such cases, the rotating machine cannot be connected directly to the prime mover's shaft, so a gearbox often must be employed, despite the attendant added complexity, loss in efficiency, and potential for mechanical failure. Overdrive gearboxes (i.e. those for which output speed is higher than input speed) are known to be particularly unreliable. For example, wind turbines rotate so slowly that either an undesirable overdrive gearbox or a conventionally-designed generator with an excessively large pole count would be required. On the other hand, to obtain proper operation with desired mechanical efficiency, typical gas turbine engines rotate so rapidly that even with a low pole count, the frequency output by a directly-driven generator is unacceptably high. The alternative for both motoring and generating applications is active power conversion.

As used herein, the term "power electronics" is understood to mean electronic circuitry adapted to convert electric power supplied as direct current (DC) or as alternating current (AC) of a particular frequency and waveform to electric power output as DC or AC, the output and input differing in at least one of voltage, frequency, and waveform. The conversion is accomplished by a power electronics conversion circuitry. For other than a simple voltage transformation of AC power using an ordinary transformer that preserves frequency and simple bridge rectification of AC to provide DC, modern power conversion ordinarily employs non-linear semiconductor devices and other associated components that provide active control. Often suitable voltage and current control and regulation are included in the control circuitry.

As discussed herein, machines constructed in accordance with the present invention are operable as motors or generators over a much wider range of rotational speed than conventional devices. Suitable power electronics also facilitates variable speed operation over a similarly wide range, which is desired in many diverse end uses. In many cases, the gearboxes heretofore required in both motor and generator applications can be eliminated. However, the resulting benefits also require the use of power electronics operable over a wider electronic frequency range than employed with conventional machines.

The performance characteristics of the machine and its associated power electronics are best co-optimized, depending upon the desired performance of the machine system. Examples of desired performance characteristics include commutating at high frequencies, maintaining a low inductance, and maintaining acceptable low speed control. Suitable power electronics are a key element for obtaining the maximum possible performance from the electric device. Poor power electronics could also result in power electronics (PE) ripple, an undesirable variation in torque during operation of an electric device which can adversely affects the performance.

High Pole Count, High-Frequency Design Using Low Loss-Materials

The present structure and method are applicable to dynamoelectric machines having a pole count ranging from low to high. However, the benefits of the present configuration are especially realized in machine systems wherein the incorporation of low-loss materials in the stator permits use of high pole counts in combination with operation at frequencies above typical line frequencies. For example, in certain embodiments, the present invention provides a brushless permanent magnet electric device with a high pole count that operates with a commutating frequency of at least 200 Hz. More preferably, the machine is adapted to operate continuously at a commutating frequency greater than about 500 Hz, and still more preferably, at a commutating frequency ranging from about 500 Hz to 3 kHz or more. Most preferably, the machine operates under excitation at a frequency ranging from about 600 Hz to 1200 Hz, e.g. at 1000 Hz.

Designers traditionally have avoided high pole counts for high speed machines, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means. Under certain conditions, the heating of the Si—Fe material may even be severe enough that the machine cannot be cooled whatsoever, and will self-destruct. However, it has been determined that the low-loss characteristics of suitable amorphous, nanocrystalline and optimized Fe-based metals allow much higher switching rates than possible with conventional Si—Fe materials. While, in a preferred embodiment, the choice of amorphous metal alloy, such as METGLAS® 2605SA1 alloy, removes the system limitation due to heating at high frequency operation, the winding configuration, rotor design, and overall machine configuration are also improved to take better advantage of the beneficial properties of the amorphous material.

The ability to use much higher exciting frequencies permits the present machine to be designed with a much wider range of possible pole counts. The number of poles in the present device is a variable based on the minimum size of magnets practical to produce, permissible machine dimensions (a physical constraint), and the expected performance range. Subject to allowable exciting frequency limits, the number of poles can be increased until magnetic flux leakage increases to an undesirable value, or performance begins to decrease.

Pole and slot counts in the preferred machine may be as large as 96 or more. For certain low-speed devices, such as wind-driven generators, even higher values (double or more) are preferred. The machines provided are generally more efficient than typical devices in the industry when operated in the same speed range, and as a result provide greater range of possible speeds. The present configuration is particularly attractive for the construction of machines having a very wide range of speed, power, and torque ratings, in a manner that combines high energy efficiency, high power density, ease of assembly, and efficient use of expensive soft and hard magnetic materials. In practice, the number of rotor poles is also constrained by mechanical limits attending stator construction, since stator slots must coincide with the rotor magnets. These mechanical and electromagnetic constraints in concert limit the number of slots that can be made in the stator for a given frame size. Some boundaries can be set to determine an upper limit on slot number for a given stator frame that provides a proper balance of copper and soft magnetic material. Adjustment of the balance can be used as a parameter in making well performing axial gap machines. Hence, preferred embodiments of the present machine ordinarily has about 4 or 5 times the number of poles typical for current industrial machines of comparable physical size.

As an example, for an industry typical motor having 6 to 8 poles, for motors at speeds of about 800 to 3600 rpm, the commutating frequency is about 100 to 400 Hz. Also available in industry are high pole count of greater than about 16 poles, but speeds of less than 1000 rpm, which still corresponds to a frequency less than 300 Hz. Alternatively, motors are also available with a relatively low pole count (of less than about 6 poles), and with speeds up to 3000 rpm, which still have a commutating frequency less than about 400 Hz. In different embodiments, the present invention provides machines that are, for example, 96 poles, 1250 rpm, at 1000 Hz; 54 poles, 3600 rpm, at 1080 Hz; 4 poles, 30000 rpm, at 1000 Hz; and 2 poles, 60000 rpm, at 1000 Hz. The motors of the invention therefore provide factors of 4 or 5 higher frequencies when compared to "standard" motors. The motors of the invention are more efficient than typical motors in the industry when operated in the same speed range, and as a result provide greater speed options.

Slot Per Phase Per Pole Ratios

The slot per phase per pole (SPP) value of an electric machine is determined by dividing the number of stator slots by the number of phases in the stator winding and the number of DC poles (SPP=slots/phases/poles). In the present description and calculation of SPP values, a pole refers to the non-time-varying magnetic field, also referred to herein as a DC field, which interacts with a changing magnetic field, i.e., one that varies in magnitude and direction with both time and position. In the preferred embodiments, permanent magnets mounted on the rotor provide the DC field, and hence the number of non-time-varying magnetic poles, referred to herein as DC poles. In other embodiments, a DC electromagnet can provide the rotor DC field. The electromagnets of the stator windings provide the changing magnetic field, i.e., one that varies with both time and position. A slot refers to the spacing between alternating teeth of the stator of the present machine. The number of poles is twice the number of pole pairs that each stator tooth encounters during each rotation of the rotor.

Conventional machines are frequently designed to have an SPP ratio of 1 to 3 to obtain acceptable functionality and noise levels and to provide smoother output due to better winding distribution. SPP ratios of 1 or more inherently require distributed turns. However, designs with a fractional SPP value, e.g. 0.5, have been sought to reduce the effect of end turns. End turns are the portions of wire in the stator coils that connect the windings between slots. Although such connection is, of course, required, the end turns do not contribute to the torque and power output of the machine, but still increase the total amount and length of wire required and contribute ohmic losses to the machine while providing no benefit. Low SPP values in conventional configurations also tend to raise levels of power electronics ripple and the attendant, deleterious torque variations. Hence, one goal of the machine designer is to minimize end turns, while still providing a machine with manageable noise and cogging and low power electronics ripple.

However, use of advanced, low core loss materials allows slot and pole count and commutating frequency to be raised concomitantly, so that noise and cogging can be kept to acceptable levels. Thus, the present machine is preferably implemented with an SPP ratio ranging from about 0.25 to 4.0.

For example, a four-phase configuration may have 48 slot and 36 poles, resulting in an SPP=0.33, while a three-phase embodiment might have 48 slots and 64 poles for an SPP=0.25. In different representative embodiments, the SPP ratio is 0.25, 0.33, 0.5, 0.75, 1.0, or greater than 1.0. More preferably, the SPP ratio ranges from about 0.25 to 1. In a still more preferred embodiment, the SPP ratio is 0.5.

Embodiments in which multiple slots are wired into a common magnetic section have an SPP greater than 0.5. This is the result of there being a greater number of stator slots than rotor poles, resulting in a distributed winding. On the other hand, a value of SPP less than or equal to 0.5 indicates that there are no distributed windings. A convention in the industry is to include distributed windings in the stator. However, distributed windings will raise the value of SPP, and reduce the frequency.

In some embodiments, machines having fractional SPP ratios and non-distributed windings beneficially employ modular coils. As used herein, the term "distributed winding" is signifies a stator coil in which the windings encircle a plurality of teeth instead of a single tooth, as described hereinabove. The modular coils optionally used in the present machine can be pre-formed and then slipped over single tooth sections that are not tapered. While a three-phase, wye-connected configuration is an industry convention, delta connection is also contemplated. The present machine can also employ windings that are disposed in a stacked configuration, as disclosed in the commonly owned U.S. patent application Ser. No. 10/979,336. However, any winding arrangement known in the art is applicable. The windings may be formed in place around the teeth, or they may be separately prepared as an assembly and slipped over the tooth ends.

Furthermore, with the relatively high pole counts of the electric machines provided herein, and with a SPP ratio at 0.5 or less, the magnets of the rotor (and the rotor structure in general) can be made thinner and less expensively.

Flexibility in Wiring/Winding Design

Preferred implementations of the present device advantageously permit the manufacturer to utilize different wiring configurations. Traditional stator designs limit winding design choices because of the above-mentioned focus on using SPP ratios of 1.0 to 3.0, which require distributing the windings over multiple slots. It becomes difficult to have more than two or three winding options with distributed windings. The present invention provides the ability to take advantage of the SPP=0.5 design, in which there is typically only one discrete coil per stator tooth. However, the invention does not exclude other arrangements with SPP=0.5. The single tooth coil can be easily modified and re-connected to provide any voltage demanded by a given application. Thus a single set of motor hardware can provide a broad range of solutions simply by changing the coil. Generally, the coil is the easiest component in an electromagnet circuit to modify.

Thus, given an SPP ratio approaching 0.5 as in the device of this invention, there is significant flexibility as to stator winding configurations. For example, the manufacturer may wind each stator separately from one another, or the manufacturer may provide separate stator windings within the same stator. This capability is one of the advantages of a system with a SPP equal to 0.5. Although there have occasionally been industry systems that employ SPP=0.5, they are not widespread and have met with success only in niche applications. The present invention successfully provides a system with SPP equal to 0.5 that allows for this flexibility in winding.

Thermal Properties and Efficiency

The ability to dissipate enough waste heat is a factor limiting the output rating of virtually every electric machine. Waste heat comes from a number of sources, but predominantly from ohmic losses, skin and proximity effect losses in the windings, rotor losses from eddy currents in magnets and other rotor components, and core loss from the stator core, whatever soft magnetic material is used. Since waste heat increases with rotational speed, the "continuous power limit" of conventional machines is often determined by the maximum speed at which the machine can operate continuously while still dissipating enough of the waste heat to prevent an unacceptable temperature rise. The continuous power limit is also a function of the current because of ohmic (Joule) losses. Except in certain very high speed motors, windage losses are typically negligible. The calculations herein include a windage correction to total losses made using conventional textbook formulas.

Often machine design is carried out using the constraint of a preselected, fixed limit on the rate of heat dissipation per unit active surface area regarded as permissible for continuous operation. Different values apply, depending on the precise mode of heat extraction. The least demanding machine designs involve an open frame through which ambient air is circulated, generally using a fan mounted on the device shaft, to effect convective heat removal. Closed-frame, air-cooled designs, in which only the exterior device surface is available to shed heat, must assume a lower dissipation. More demanding applications, especially for high-speed motors, may rely on more exotic techniques, including circulating liquid, phase-change cooling, heat pipes, or other like means, that improve extraction rates. By increasing the allowable heat dissipation, the apparent power and torque ratings of a given machine design can be increased.

In the high frequency, high pole count electric devices optimally applicable in the practice of the present invention, less waste heat is generated because the amorphous, nanocrystalline, and optimized Fe-based metal alloy of the stator core have lower losses than conventional Si—Fe. Previous attempts top use improved soft magnetic materials have typically involved only direct substitution without altering the basic machine configuration, possibly with increased operating frequency. However, it has been found that the designer can beneficially exploit the low loss characteristics of these materials by increasing the frequency, speed and power, and then further by correctly balancing and "trading" the low core loss versus the ohmic loss. Overall, for the same power as conventional machines, the high frequency, high pole count electric devices optimally applicable in the present invention exhibit lower loss, and hence higher torques and speeds, and can thus achieve higher continuous speed limits than conventional machines.

As is conventional, device efficiency is defined as useful power output divided by power input. Preferred implementations of the present machine exhibit high power efficiency. They exceed the industry standard high frequency limit of 400 Hz, beyond which there have heretofore been few, if any practical applications.

Certain preferred embodiments of the present machine employ high pole and slot counts, and operate with synchronous frequencies higher than the maximum of 400 Hz conventionally used. These high frequencies ordinarily would be expected to increase total rotor losses to unacceptable values. It is surprising and unexpected that the present design provides for much thinner rotor magnets than those used in conventional machines. Without being bound by any theory, it is believed that the reduction in thickness of the magnets is made possible by two factors. First, the use of low-loss stator material permits pole count to be increased, thereby reducing the transverse size of each pole magnet. The thickness of each magnet can therefore be reduced, while still maintaining a substantially constant aspect ratio. (i.e., the ratio of thickness to equivalent transverse dimension). The decreased thickness, in turn, results in a lower total magnet volume, reducing both magnet losses and material costs. Second, in order to keep the copper fraction of the stator face near constant, high slot count machines are provided with narrower slots than low slot count machines. These narrow slots present to the rotor a smaller cyclic variation in circuit permeance than do wide slots during rotor movement. Both of these factors contribute to a reduction in flux perturbations on the rotor. Lower rotor flux perturbations, in turn, result in lower rotor eddy current losses. As a result of the thin magnets utilized by these embodiments, the total magnet mass needed is substantially lower than the mass used in conventional designs. Typically on a per unit mass basis, permanent magnets are the most expensive components of an electrical machine. Advantageously, use of high pole and slot counts, which operate with synchronous frequencies higher than the maximum of 400 Hz conventionally used, significantly reduce the overall size and cost of the machine; and markedly improve its efficiency.

However, the performance and increased efficiency of the preferred high-frequency, high pole count electric devices applicable to the present invention are not simply an inherent result of replacing conventional Si—Fe with amorphous metal. A number of designs with amorphous metal have been proposed, but have met with performance failure (including overheating and lower output power). This failure is believed to have arisen in large measure as a result of merely applying new materials (e.g., amorphous metals) and production methods in machines that were designed based on the characteristics of a conventional material (Si—Fe containing 3.5% or less of Si by weight). The early performance failure, combined with the perceived cost of processing amorphous metal into motors, led the industry to abandon the research efforts.

The presently preferred electric devices overcome the performance failures of the prior art through the design of a rotating electric machine that suitably takes best advantage of the beneficial properties of amorphous, nanocrystalline, or optimized Fe-based metal alloy. Also provided in an aspect of the present invention are construction methods compatible with the physical and mechanical characteristics of the various improved materials. Preferred implementations of the present machine possess, in combination, the advantageous qualities of operability at commutating frequencies greater than 400 Hz, with a high pole count, at high efficiency and with a high power density. While other conventional methods have been able to provide motors with only a combination of at most two of the four qualities, the present invention provides motors that exhibit all four qualities simultaneously.

Idealized Square Torque-Speed Curve

In an aspect of the present invention, there is provided an electric device that operates with a more rectangular torque-speed curve than conventional machines.

The speed and torque capabilities of any machine may be graphically delineated as a region in an allowable region of a torque-speed plane. An ideal dynamoelectric machine is operable at any combination of torque and speed up to certain limiting values for each. A machine having such capability is said to have a rectangular torque-speed curve. That is to say, the machine can operate at any combination of torque and speed up to allowable limits of each, with full rated torque being available up to a maximum rated speed. A rectangular torque-speed curve is sometimes called a square torque-speed curve, owing to the generally perpendicular intersection of the lines defining maximum torque and speed of the device's operating region in the torque-speed plane.

FIG. 5A shows an approximation to an ideally rectangular torque-speed curve. It includes, as case 1, the torque-speed curves of a motor designed according to the invention and a conventional motor, where speed is plotted on the horizontal axis, and torque on the vertical axis. The pole count chosen for both machines was 8, although any pole count could be chosen as means of comparison.

In practice, the rectangular torque-speed curve for a conventional machine is significantly limited. Above a certain relatively low speed, available torque (vertical axis) decreases rapidly, being limited by the dominance of the ohmic contribution to the overall heat production. Additionally, the speed (horizontal axis) is limited by the increase of stator core losses with increasing frequency, as discussed previously. This behavior is schematically shown in FIG. 5A. By contrast, while the motor of the present invention provides similar torque, its speed range is greatly extended because of its much lower frequency-related losses.

Thus, conventional motors are limited in that they can either provide low torque for high-speed ranges (low power), or high torque for low-speed ranges. The present invention successfully provides motors that can do both, i.e. provide high torque in combination with high-speed capability.

FIG. 5B shows case 2, which further depicts behavior of a preferred machine of the present invention that is re-designed to have 36 poles. The core losses permit the machine to attain a speed limit similar to that of the conventional machine. However, as result of high frequency generated EMF, the corresponding ohmic loss for a given torque is much lower in this invention than in the conventional machine, thus allowing the invention to increase the motor torque without exceeding thermal limits. Therefore, as a result of exploiting the properties of the low-loss material, preferred implementations of the present machine out-perform the conventional motor in a manner that is surprising and unexpected, the improved performance and combination of extended speed and torque ranges not being achievable using any optimization of the existing device without the combination of novel magnetic materials and commensurately designed machine configuration.

More specifically, the electric device of the present invention provides a torque-speed curve with a significant increase in the amount of area under the curve as compared to a conventional device. Increased area under the curve indicates the much wider range of applications that can now be reached for a given design. It is known the power increases linearly with speed. With the increased device speed and constant torque as provided by this invention, the device has a greater power density, i.e., more power for fixed size, without exceeding allowable thermal limits. In both cases 1 and 2 presented above, the motor of this invention outperforms the conventional motor.

A number of applications in current technology, including such widely diverse areas such as high-speed machine tools, compressor motors, aerospace motors and actuators, and spindle drive motors for magnetic and optical disk drives used for data storage in computers and other microelectronic devices, require electrical motors operable at high speeds, many times in excess of 15,000–20,000 rpm, and in some cases up to 100,000 rpm.

Total Harmonic Distortion

A further advantage of preferred embodiments of the present machine is the clean sinusoidal back EMF curve attained. Such a curve is characterized by a low value of total harmonic distortion (THD). A high THD is undesirable, being indicative of additional and non-productive current flow, which in turn causes additional heating. Preferred designs afford a THD value of less than 5%. THD values less than about 1% are more preferred. Importantly, some regulatory agencies will only certify devices having a THD value below a required threshold. For example, certain THD values must be met in order to obtain a European CE mark.

An SPP ratio of 0.5 tends to produce a more sinusoidal back EMF, which output can be further improved by the electronics. Use of advanced, low-loss material makes possible the preferred SPP=0.5 configuration, whereby desirably low values of THD are easily obtained.

Preferred Design Method

Figure 12:
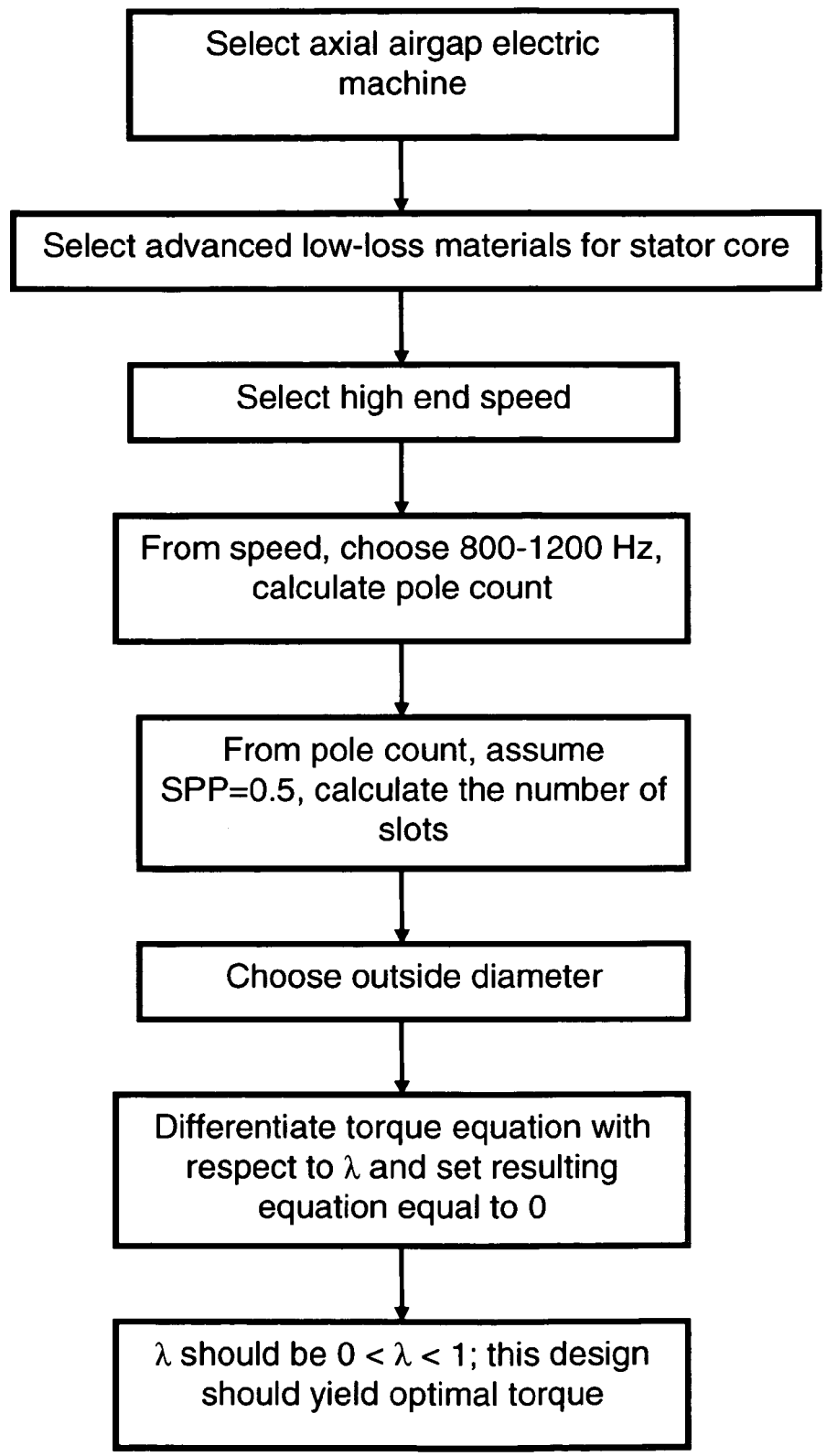
FIG. 12 is a flowchart representative of an implementation of a method of designing an efficient high speed axial air-gap electric device using low-loss materials in accordance with the invention.

A method for determining an appropriate design for various preferred embodiments of the present invention is set forth in FIG. 12. The design method therein is based upon a recognition that, by suitable analysis of key design equations, a machine can be defined with relatively few parameters. By specifying the machine with as few parameters as possible, certain variables can be maximized, and the electric machine can be optimized at a given speed. The FIG. 12 method permits design of an axial air-gap machine with optimized torque at a given speed, and therefore, optimized power. It will be recognized that comparable design methods apply to other machine configurations.

In order to design such a machine, the machine must first be reduced to a single equation that expresses the torque of the machine with as few parameters as possible. In the present method, it has been determined that the torque of an axial air-gap machine can be expressed according to the following equation:

$$\tau = \frac{1}{24} \cdot j \cdot 2^{\frac{1}{2}} \cdot (-\lambda \cdot D \cdot \pi + h \cdot t + x \cdot t) \cdot L \cdot pf \cdot D \cdot$$
$$(-D \cdot \pi - D \cdot \pi \cdot \lambda^2 + 2 \cdot \lambda \cdot D \cdot \pi - 2 \cdot h \cdot t + 2 \cdot h \cdot t \cdot \lambda) \cdot B$$

wherein,
$\tau$=the output torque of the electric machine (N·m):
j=the current density (A/mm$^2$);
D=the outer diameter of the stator (mm);
h=the corepoint tooth width at the inner diameter (mm);
t=the total slots per stator;
x=total wasted slotwidth from insulation in the stator (mm);
pf=the packing factor as a percent slot fill;
L=the axial length of the coil (mm);
B=peak flux density (T);
$\lambda$=ratio of inner stator diameter/outer stator diameter.

Figure 13:
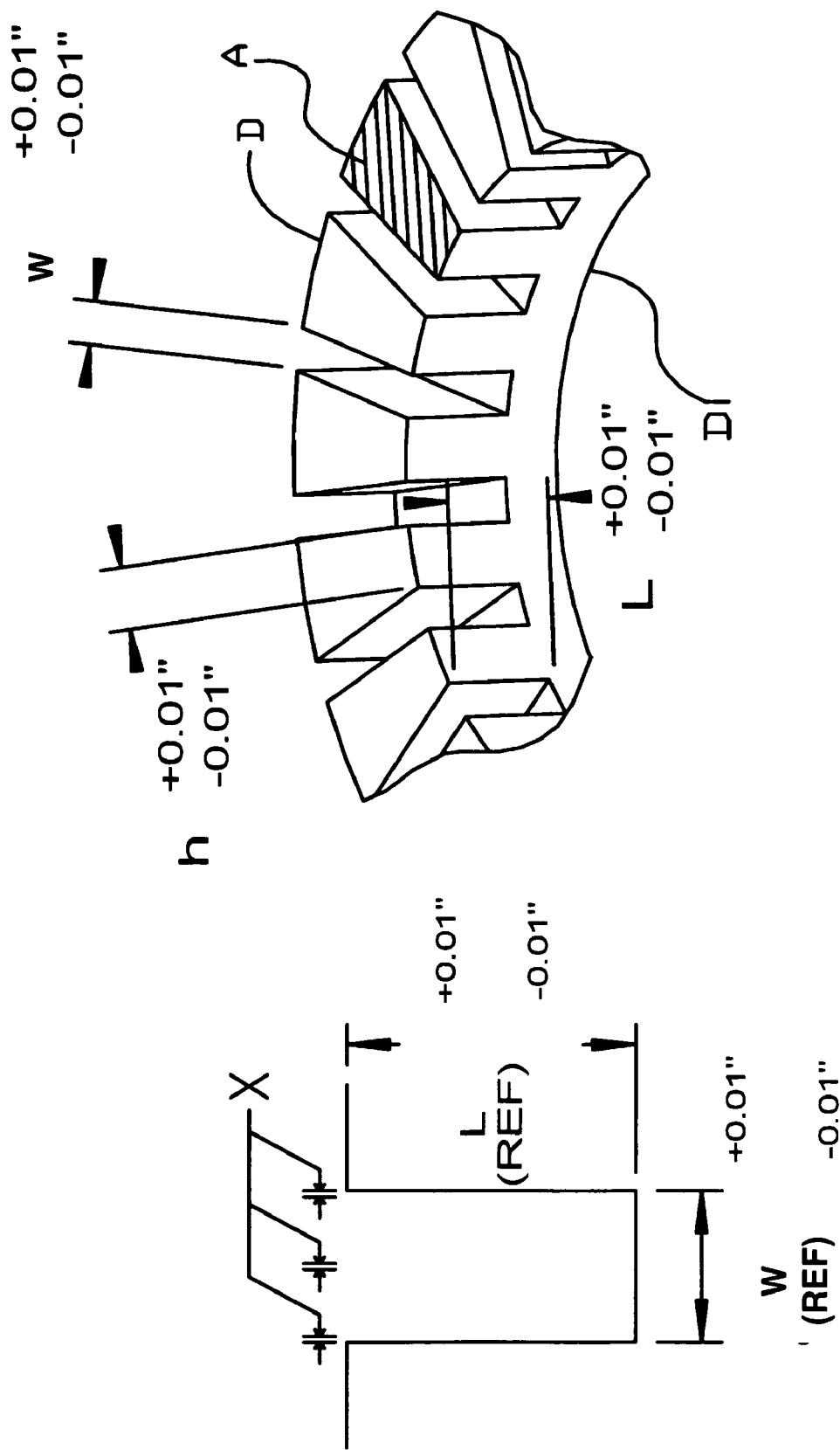
FIG. 13 is a perspective view of a portion of a stator core depicting certain core dimensions used in an implementation of the design method of the invention represented by FIG. 12.

Several of the above variables are also referenced in graphic form in FIG. 13.

Figure 14:
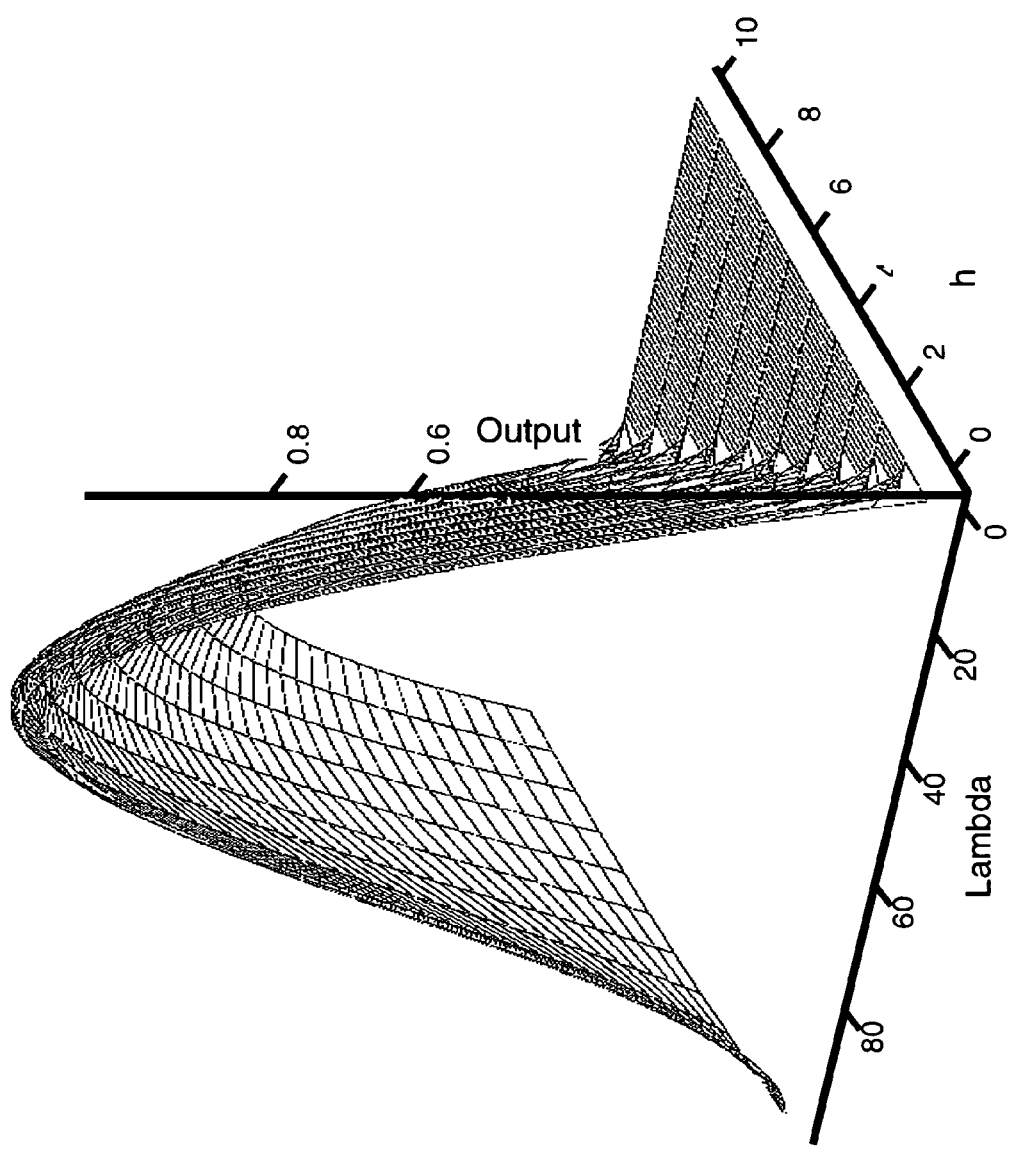
FIG. 14 is a graph in the form of a surface plot depicting the relationship between torque and certain stator dimensions for a machine designed in accordance with the present method.

As seen from the above equation, there are at least 9 significant design parameters. However, when approaching any instance of a design, many of these variables will be at least somewhat constrained by practical considerations. For example, in the above equation, assume that based upon the type of machine being designed, j, x, pf, L and B are not truly subject to change. This leaves λ, D, h and t as the only free parameters. As discussed below, the designer then selects a D and t value, depending upon design flexibility. This leaves an equation for torque τ that depends only on h and λ. The graph of such an equation will result in a surface plot such as that shown in FIG. 14. By differentiating the torque equation with respect to λ and setting the resulting equation equal to zero, the designer can solve for the value of λ that provides an optimal torque for all of the given inputs. Of course, the solution is valid only if the inherent geometrical constraint that 0<λ<1 is satisfied.

The above design method is summarized by the flowchart shown in FIG. 12. The designer of the machine assumes an axial air-gap machine with a stator comprised of advanced low-loss materials and then selects a desired high end speed. Next, a desirable synchronous frequency of the machine, such as a frequency in the range of about 800–1200, e.g., 1000 Hz, is chosen and the pole count is calculated according to the equation f=N·P/2, where N is the desired high end operating speed and P is the number of poles. Then, using the calculated pole count and assuming SPP=0.5, as discussed hereinabove as being preferred, the number of stator slots can be calculated. Depending upon the desired application and limitations, the outer diameter of the machine is chosen. This leaves only h and λ for determination according to the torque equation provided above. The torque equation is then differentiated with respect to λ, and the resulting equation is set equal to zero. That equation is then solved for λ. The solution that yields λ between zero and 1 will provide an optimal torque for all of the given inputs. If desired, the foregoing process may be applied iteratively.

As described above, the above design method provides a preferred embodiment of an efficient and high powered high speed electric device using advanced low-loss materials. Of course, other embodiments and designs outside of the preferred embodiments are contemplated without departing by the spirit and scope of the present invention.

Power and Torque Density

In a preferred embodiment, the invention provides a machine having high power and torque densities measured on either a volumetric or mass basis. That is to say, the machine exhibits high values of available torque and power and low values of waste heat per unit active mass and active volume.

For purposes of comparison, the term "active material" of a rotating machine is understood herein to include all those materials that carry electrical current or magnetic flux for the purpose of producing torque, e.g. the soft and hard magnetic material used in the rotor and stator and the conductive wire (usually copper or aluminum) including its insulation. The term "active mass" is understood to be the total mass of active material in the machine. The terms "active volume" and "active area" of a rotating machine are respectively understood to mean the volume and external surface area of a right circular cylinder having a diameter and length defined by the outermost diametrical and length extent of active material in the machine. The active volume and active area thus do not include the external case of a machine or structures such as cooling fins. Existing machines often incorporate such structures to maximize heat transfer, especially in closed-frame devices for which heat extraction is particularly problematic. The amount of area and volume associated with these portions in practical machine designs vary greatly. Excluding them permits fair comparisons that are not skewed by apparent but illusory advantages that do not reflect fundamental improvements in efficiency afforded by the present machine.

As set forth above, the design of a dynamoelectric machine entails selection of a large number of dimensional and operational parameters, as well as the choice of suitable magnetic materials. Performance comparisons among different designs are thus facilitated by referencing important quantitative parameters, such as available power and torque and waste heat output, on a normalized basis, e.g., per unit mass, volume, or surface area. Such comparisons help to avoid viewing a design as having an apparent but illusory advantage that arises not from actual improvement but from an inappropriate comparison. For example, the efficiency of an overdesigned, oversized unit might appear greater than that of a smaller reference design. In addition, the extra size invariably increases cost, especially since the magnetic materials are often the most costly constituents of the machine. To be valid, a comparison must also involve machines intended for the same duty cycle. It is well known that a given machine can deliver much higher output for short durations or in intermittent duty, than for extended or continuous operation at the same conditions. Operating a machine designed only for short duty cycles for extended periods under load is almost certain to shorten its useful life, and is likely to cause it to overheat and burn out almost immediately.

As is conventional in the dynamoelectric machine art, the losses of a permanent magnet machine can be ascertained by operating the machine as a generator, in particular by connecting the machine shaft to a prime mover producing torque and connecting each of the phase windings to a purely resistive electrical load. The loss is determined by subtracting the useful power produced by the generator (the aggregate $i^2R$ dissipation in the resistive loads) from the mechanical power input ($2\pi\tau N/60$, wherein N is measured in rpm). This characterization permits the behavior of the machine itself to be studied apart the behavior of the particular power electronics that would be required for testing and operation of the machine in motoring mode.

Designs of electrical and electronic equipment in which heat must be extracted to prevent overheating are often premised on assumed values of the feasible rate of heat extraction per unit surface area. In general, enough heat must be dissipated to prevent excessive internal temperature rise in the machine. Temperature rise must be limited to prevent breakdown of electrical insulation, irreversible rotor magnetization loss, and other serious consequences. For example, experience has shown that the surface of electrical and electronic components of a wide variety of types can continuously dissipate about 0.2 W/cm$^2$ in still room air without rising in temperature by more than about 100° C. Forced cooling of the components using flowing air or liquid permits higher limits, as do more exotic means, such as heat pipes. In dynamoelectric machine designs, continuous dissipation of 0.4 W/cm$^2$ is often regarded as requiring forced air cooling, e.g. using an open-frame design with a blower, while 0.6 W/cm$^2$ likely requires liquid cooling.

In various implementations, the present device provides high power and torque densities, while maintaining high efficiency and losses that are low enough to permit waste heat to be extracted during continuous operations. In particular, the waste heat can be extracted in different embodiments suitable for open and closed-frame air cooled devices, as well as devices providing higher heat transfer, e.g. through liquid cooling, heat pipes, phase change media, or the like.

For example, an implementation provides a machine having a torque density of at least about 2.5 N-m/kg and a loss density of at most about 0.2 W/cm$^2$, the values being measured during continuous operation of the machine as a generator connected to a resistive load and at a rotational speed providing electrical output at a frequency of at least about 500 Hz. In another implementation, the machine provides a torque density of at least about 3.4 N-m/kg and a loss density of at most about 0.4 W/cm$^2$, during continuous 750 Hz operation. Still another machine provides a torque density of at least about 3.8 N-m/kg and a loss density of at most about 0.6 W/cm$^2$, during continuous 1000 Hz operation. More preferably, the machine provides a torque density of at least about 6.0 N-m/kg and a loss density of at most about 0.4 W/cm$^2$, during continuous 750 Hz operation. Most preferably, the machine provides a torque density of at least about 8.0 N-m/kg and a loss density of at most about 0.6 W/cm$^2$, during continuous 1000 Hz operation The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Comparative Examples 1–2 and Examples 1–3

Configuration and Properties of Dynamoelectric Machines

Table II below sets forth characteristics of certain dynamoelectric machines of the prior art and machines in accordance with the present invention. Comparative Examples 1–2 are, respectively, a 10 kW, 750 rpm ironless disk type permanent magnet brushless motor, as published by Gieras et al., IEEE IAS (Jul. 2, 2002), and an equivalent 10 kW, 750 rpm with conventional stator and rotor cores. Examples 1–3 are embodiments of motors of the present invention.

As shown in Table II, Examples 1–3, designed according to the principles disclosed herein, provide in motoring mode equal or greater power, the same speed, equal or greater torque, approximately the same efficiency, and greater current density (as a result of the lower core losses). Surprisingly, the motor of the invention also uses less permanent magnet material and, in fact, less active material overall than the Gieras et al. motor or a conventional motor. Table II also shows that in motoring mode using suitable power electronics, the invention provides machines that have equal or better torque per kilogram of active material than the Gieras et al. machines, and are less expensive and operate at much higher frequency (by a factor of 2 or more), with a similar thermal rating. This is accomplished through exploiting the advantageous properties of the amorphous metal for these embodiments.

Comparative Examples 3–6 and Examples 4–5

Configuration and Properties of Dynamoelectric Machines

Table III provides a comparison of the design parameters and performance of motors of the present invention (Examples 4–5) with those of Comparative Examples 3–6, which are a dual-rotor, radial-flux, toroidally-wound, permanent magnet machine (RFTPM) as published by Qu et al., IEEE IAS (Jul. 2, 2002), a commercial Induction Motor (IM), an Interior Permanent Magnet machine (IPM), and an Axial-Flux Toroidally-Wound Permanent Magnet machine (AFTPM), respectively. Examples 4 and 5 operate at a frequency of 510 Hz. Table III shows that the motors of the invention provide greater torque for a given speed and at a higher efficiency for operation in motoring mode using suitable power electronics.

TABLE II

Comparison Of Design Parameters And Performance

| Parameter | units | Comp Ex 1 Cylindrical with core[1] | Comp Ex. 2 Ironless disk type[2] | Ex. 1 | Ex. 2 | Ex. 3 |
|---|---|---|---|---|---|---|
| Power | kW | 10 | 10 | 10 | 12.4 | 10 |
| Speed | rpm | 750 | 750 | 750 | 750 | 750 |
| Torque | N-m | 133 | 131 | 131 | 158 | 128 |
| Efficiency | % | 91.4% | 92.5% | 92.3% | 92.1% | 93.5% |
| Current density | A/mm$^2$ (rms) | 4.2 | 4.2 | 9 | 10 | 6.3 |
| Perm. magnet material | kg | 1.57 | 12.4 | 2 | 1.9 | 1.8 |
| Total active material[3] | kg | 35.3 | 17.0 | 23 | 13.8 | 17.5 |
| Active material cost[4] | $ | 121 | 859 | 527 | 244 | 266 |
| Power density | W/kg | 283 | 588 | 435 | 899 | 571 |
| Torque density | N-m/kg | 3.8 | 7.7 | 5.7 | 11.4 | 7.3 |
| Frequency | Hz | 100 | 100 | 225 | 400 | 488 |
| Winding OD | mm | 360 | 360 | 300 | 360 | 360 |
| Heat dissipation per unit active area | | natural cooling | natural cooling | 1 W/in$^2$ = 0.16 W/cm$^2$ | 1 W/in$^2$ = 0.16 W/cm$^2$ | 1.3 W/in$^2$ = 0.20 W/cm$^2$ |

[1]Conventional iron core motor (data provided by Gieras et al.)
[2]Ironless disk type design of Gieras et al.
[3]Active material mass data from Gieras et al. corrected to exclude the shaft mass.
[4]Active material cost based on costs per kg of $65, 5.50, and 1.25 for FeNdB permanent magnets, copper windings, and conventional soft magnetic material, respectively, as provided by Gieras et al. and $5.50 per kg of advanced soft magnetic material used in Examples 1–3.

TABLE III

Comparison Of Design Parameters And Performance

|  |  | CE3 IM[a] | CE4 IPM[c] (NdFeB) | CE5 AFTPM[d] (Ferrite) | CE6 RTFTPM[e] (Ferrite) | Ex. 4 | Ex. 5 |
|---|---|---|---|---|---|---|---|
| power | hp | 3 | 4.96 | 1.18 | 2.98 | | |
| power | kW | 2.2 | 3.7 | 0.9 | 2.2 | 2.6 | 2.6 |
| torque | N-m | 12.18 | 20.2 | 3 | 11.78 | 14 | 14 |
| speed | rpm | 1755 | 1750 | 2800 | 1800 | 1800 | 1800 |
| volume | cm$^3$ | 8092[b] | 10391 | 1272 | 2730 | 1484 | 1903 |
| weight | kg | 35.4 | 48 | 5.5 | 11.76 | 5.5 | 7.8 |
| torque density | N-m/kg | 0.34 | 0.42 | 0.55 | 1.00 | 2.55 | 1.79 |
| torque density | N-m/cm$^3$ | 0.0015 | 0.0019 | 0.0024 | 0.0043 | 0.0094 | 0.0074 |
| efficiency | % | 82.5% | 88.0% | 83.0% | 87.1% | 86.6% | 90.4% |
| loss | W | 475 | 505 | 180 | 329 | 402 | 276 |
| active surface | cm$^2$ | 2442 | 2884 | 712 | 1184 | 789 | 931 |
| loss density | W/cm$^2$ | 0.19 | 0.17 | 0.25 | 0.28 | 0.51 | 0.30 |

[a]GE Model # 5K182BC218A Motor, data provided by Qu et al.
[b]Excluding room for the fan and heat sink.
[c]Yasakawa Electric Co. motor, data provided by Qu et al.
[d]Designed by Federico Caricchi, data provided by Qu et al.
[e]Radial-flux, toroidally-wound, permanent magnet machine designed by Qu et al.

Example 6

Configuration and Properties of a Dynamoelectric Machine of the Invention

A three-phase axial airgap motor (Example 6) is designed according to the concepts described above. The magnetic stator core of the motor is formed from Metglas® alloy 2605SA1, and is slotted with 54 equally spaced teeth. The stator winding is a single layer of 26+/−1 turns of a coil with resistance of about 0.011Ω at room temperature. The rotor assembly is constructed using 36 rotor magnets composed of a rare earth-iron-boron magnet alloy having a maximum energy product greater than 36 MGOe and an intrinsic coercive field greater than 21 kOe. The magnets are approximately 65×14×8 mm in size and are magnetized along the 8 mm dimension. They are arranged with alternating polarity in a rotor plate. Representative performance characteristics of this electric machine operated in motoring mode using suitable power electronics are set forth in Table IV below.

TABLE IV

Exemplary Performance Of A Dynamoelectric Machine Of The Invention

| Property | units | |
|---|---|---|
| Inverter | Vrms line | 320 |
| Real Output Power | kW | 80.9 |
| Shaft torque | N-m | 214 |
| Speed | rpm | 3600 |
| Efficiency | | 94% |
| Machine Cooling | | Liquid |
| Pole Pairs | | 18 |
| Slots per Stator | | 54 |
| SPP | | 0.5 |
| Active Machine Size | | |
| Outside Diameter | mm | 290 |
| Length | mm | 72 |

TABLE IV-continued

Exemplary Performance Of A Dynamoelectric Machine Of The Invention

| Property | units | |
|---|---|---|
| Electrical Properties | | |
| Ke | Vrms/krpm line | 66 |
| THD of Ke | | 2.9% |
| Resistance per phase | mΩ | 11.8 |
| Inductance per phase | μH | 85.8 |
| Active Material Mass | | |
| NdFeB Magnet | kg | 2.0 |
| Copper | kg | 3.7 |
| Amorphous Metal | kg | 19.1 |
| Torque Density | | |
| per unit active mass | N-m/kg | 8.0 |
| per unit active volume | N-m/cm$^3$ | 0.045 |

The machine of Example 6, if operated in motoring mode, exhibits an advantageous combination of features, e.g. high output torque density, high electrical efficiency, and efficient use of magnetic materials.

Comparative Example 7

Configuration and Properties of a Conventional Machine

A representative electric machine (Comparative Example 7) is designed in accordance with conventional practice. The machine has an axial gap, 3-phase configuration having 12 poles and 18 slots, yielding a rotational speed of 3600 rpm for 360 Hz excitation. The active volume of the machine is defined by the 290 mm outside diameter and 150 mm axial length of the stator. The magnetic materials used are conventional 26 gauge M19 SiFe, non-grain-oriented soft magnetic electrical steel and nominal 39 MGOe FeNdB permanent magnets.

The losses of the Comparative Example 7 machine in generator mode are determined by connecting each of the phase windings to a purely resistive load and turning the machine shaft at the requisite rotational speed by torque applied from an external prime mover. The spinning losses herein are determined by measuring the torque required to turn the shaft at the desired speed with the electrical load disconnected. Table V below sets forth the spinning loss density, expressed in units of watts per unit active area (W/cm$^2$) for the machine of Comparative Example 7 rotating at speeds of 5000, 7500, and 10,000 rpm, which correspond to phase outputs at 500 Hz, 750 Hz, and 1000 Hz in each phase.

TABLE V

Spinning Loss Densities Of Comparative Example 7

| Rotational Speed (rpm) | Electrical Frequency (Hz) | Spinning Loss Density (W/cm$^2$) | Rounded Spinning Loss Density (W/cm$^2$) |
|---|---|---|---|
| 5000 | 500 | 0.28 | 0.2 |
| 7500 | 750 | 0.51 | 0.4 |
| 10000 | 1000 | 0.77 | 0.6 |

In order to provide a basis for comparison, the spinning loss densities are rounded to the slightly lower values shown in the last column of Table V, to account for any potential for optimization of the machine configuration. The rounded values represent what would reasonably be achievable in a machine design employing standard magnetic materials and configurations conventional in the art. For example, replacement of conventional conductive wire windings in the stator with Litz wire can substantially eliminate AC ohmic losses, and rotor losses can be minimized by segmentation. Both assumptions represent idealized machine behavior, so applying them is thus known to understate the actual losses of any real operating machine. Therefore, comparisons made with the rounded losses present the properties of machines such as the Comparative Example 7 machine in a light that is even more favorable than what is actually realized.

The resulting 0.2, 0.4, and 0.6 W/cm$^2$ values should also be viewed in light of generally accepted limits on various cooling methods. In particular, closed frame machines without externally imposed air circulation typically can be expected to continuously dissipate about 0.2 W/cm$^2$ by convention to ambient air. Active cooling techniques employing blower-forced air in an open-frame machine or circulating cooling liquid are normally regarded as being able to sustain dissipation of about 0.5 and 0.8 W/cm$^2$, respectively.

Examples 7–13

Design and Characterization of Dynamoelectric Machines of the Invention

Several exemplary electric machines designed in accordance with the present invention are set forth in Table VI below, along with the machine of Comparative Example 7. Each of these machines has an axial air gap, 3-phase configuration having the slot number stated in column 5 and an SPP of 0.5. The synchronous frequency ratio is as listed in column 2. The overall active material radius and axial length are shown in columns 3 and 4. The FeNdB magnetic material used in each machine has a nominal 39 MGOe energy product. The Comparative Example 7 machine uses conventional M19 SiFe motor laminations, whereas Examples 7 through 13 use advanced soft magnetic material as described herein.

TABLE VI

Dynamoelectric Machine Configurations

| Example | $K_f$ (Hz per 1000 rpm) | Active Radius (mm) | Active Length (mm) | Slots per Stator | Active Material Mass (kg) | Active Surface Area (cm$^2$) | λ (IR/OR) |
|---|---|---|---|---|---|---|---|
| Comp. Ex. 7 | 100 | 144.2 | 149.2 | 18 | 34 | 2659 | 0.60 |
| 7 | 300 | 97.8 | 80.2 | 54 | 8 | 1094 | 0.64 |
| 8 | 267 | 105.8 | 71.2 | 48 | 9 | 1176 | 0.60 |
| 9 | 300 | 144.8 | 77.2 | 54 | 21 | 2020 | 0.53 |
| 10 | 167 | 186.7 | 119.0 | 30 | 59 | 3586 | 0.51 |
| 11 | 500 | 215.7 | 94.4 | 90 | 47 | 4203 | 0.61 |
| 12 | 400 | 217.2 | 74.0 | 72 | 37 | 3974 | 0.65 |
| 13 | 400 | 286.7 | 97.0 | 72 | 100 | 6912 | 0.55 |

Spinning loss densities (spinning loss per unit active material area) for Examples 7–13 of the machine of the invention are tested as above under no load. Also shown are comparable values for the Comparative Example 7 machine reiterated from Table V. When any of these machines is operated as a motor, current flow beyond that required to overcome spinning losses results in available torque output. However, that current flow produces additional ohmic losses in the stator windings, resulting in additional heat that must be extracted. Table VII further sets forth calculations of the amount of torque density (available torque per unit active material mass) that is available in each of these machines for rotational speeds corresponding to phase excitation at 500, 750, and 1000 Hz, while not exceeding threshold total loss densities of 0.2, 0.4, and 0.6 W/cm$^2$, at the three respective frequencies. Such total loss densities include both the spinning losses at zero delivered torque and the extra ohmic losses from the extra current required to provide that available torque. For Comparative Example 7, no appreciable torque is available at any of the 500, 750, and 1000 Hz excitations, because the spinning losses alone reach the threshold loss density values chosen. By way of contrast, the machines of Examples 7–13 of the invention all provide some amount of available torque without exceeding the specified loss density.

TABLE VII

Spinning Loss And Available Torque Densities

| Example | Spinning Loss Density (W/cm$^2$) | | | Available Torque Density (N-m/kg) | | |
|---|---|---|---|---|---|---|
| | 1000 Hz | 750 Hz | 500 Hz | 1000 Hz | 750 Hz | 500 Hz |
| Comp. Ex. 7 | 1.09 | 0.69 | 0.37 | * | * | * |
| 7 | 0.10 | 0.06 | 0.04 | 3.8 | 3.4 | 2.6 |
| 8 | 0.10 | 0.06 | 0.04 | 5.1 | 4.3 | 3.2 |
| 9 | 0.14 | 0.09 | 0.05 | 5.8 | 4.9 | 3.5 |
| 10 | 0.30 | 0.19 | 0.10 | 4.1 | 3.5 | 2.5 |
| 11 | 0.16 | 0.10 | 0.06 | 7.1 | 6.6 | 5.1 |
| 12 | 0.13 | 0.08 | 0.05 | 9.8 | 8.4 | 6.1 |
| 13 | 0.19 | 0.13 | 0.07 | 8.3 | 7.0 | 5.0 |

* No torque available

The foregoing examples demonstrate the improved loss efficiency and the availability of appreciable torque at high speed in preferred machines implementing the present invention. On the other hand, conventionally designed and configured machines, even with foreseeable optimizations, cannot operate in the high speed regime delineated to provide useful torque. That is to say, the conventional machine cannot provide the foregoing combination of beneficial properties without overheating to the point that sustained operation is not possible. Electromechanical requirements can therefore be satisfied by a machine designed in accordance with the methods delineated herein that is smaller, more efficient in power consumption, and more reliable than heretofore possible.

TABLE VIII

Spinning Loss And Available Torque Densities For 500 Hz Excitation

| Example | Spinning Loss Density (W/cm$^2$) 500 Hz | Available Torque Density (N-m/kg) | | |
|---|---|---|---|---|
| | | 0.6 W/cm$^2$ | 0.4 W/cm$^2$ | 0.2 W/cm$^2$ |
| Comp. Ex. 7 | 0.37 | 2.3 | 0.9 | * |
| 7 | 0.04 | 3.7 | 3.4 | 2.6 |
| 8 | 0.04 | 5.1 | 4.4 | 3.2 |
| 9 | 0.05 | 6.0 | 5.1 | 3.5 |
| 10 | 0.10 | 4.8 | 4.0 | 2.5 |
| 11 | 0.06 | 6.9 | 6.7 | 5.1 |
| 12 | 0.05 | 10.1 | 8.6 | 6.1 |
| 13 | 0.07 | 9.0 | 7.5 | 5.0 |

*No torque available

Table VIII further delineates torque capabilities of the machines of Comparative Example 7 and Examples 7–13. The spinning loss density of each machine at 500 Hz is repeated from Table VII. Also set forth are the torque densities available for three different allowable heat dissipations, i.e., the 0.2 W/cm$^2$ used for the 500 Hz data of Table VII, as well as increased values of 0.4 and 0.6 W/cm$^2$. All of the data of Table VIII are for operation at rotation speeds corresponding to a synchronous electrical frequency of 500 Hz. By allowing a higher heat dissipation, more current can be passed through the phase windings in each instance, thereby increasing the available torque. As noted above, the machine of Comparative Example 7 dissipates 0.28 W/cm$^2$ in spinning loss density alone at 500 Hz, and so cannot provide useful torque at this dissipation level. Relaxing the limit to 0.4 or 0.6 W/cm$^2$ permits the Comparative Example 7 device to produce some useful torque, but the amounts available are still far lower on a per mass comparative basis than those attainable with any of Examples 7–13.

Having thus described the invention in rather full detail, it will be understood that electric devices described herein as presently representative of preferred embodiments are exemplary and are not intended as limitations on the scope of the invention. Changes therein and other uses will occur to those skilled in the art, which are encompassed within the spirit of the invention, as defined by the scope of the subjoined claims.

It will be readily apparent to one skilled in the art that various substitutions and modifications may be made to the invention disclosed herein without departing from the scope and spirit of the invention. For example, although axial gap electric machines have been generally described herein, other types of electric machines may be designed according to the principles disclosed herein, such as: (i) radial gap machines; (ii) radial air-gap, transverse flux; and (iii) linear machines. Furthermore, the electric machines could include a number of electric machines other than permanent magnet machines, such as induction machines, synchronous machines, synchronous reluctance machines, switch reluctance machines, and dc electromagnet machines. In addition, other types of rotors and/or stator winding schemes are all within the scope of the present invention. Thus, such additional embodiments are within the scope of the present invention and the following claims.

Where a component or limitation is described with a variety of different possible numbers or dimensions associated with that component or limitation, in additional embodiments, the component or limitation is in a range specified by taking any two of the particular values provided as the endpoints of the range. The range includes the endpoints unless clearly indicated to the contrary.

What is claimed is:

1. A high efficiency, high power density permanent magnet electro-magnetic device comprising:
   (a) at least one stator assembly including a magnetic core formed from a low-loss soft-magnetic material and having a plurality of slots wound with stator windings adapted to be connected to at least one electrical phase; and
   (b) at least one magnetic field assembly including a plurality of rotor poles, the magnetic field assembly comprising a plurality of permanent magnets and being arranged and disposed for magnetic interaction with the at least one stator assembly,
   wherein a torque density of the device is at least about 2.5 N-m/kg and a loss density of the device is at most about 0.2 W/cm$^2$, the values of the torque density and the loss density being measured during continuous operation of the device as a generator connected to a resistive load and at a rotational speed providing electrical output at a frequency of at least about 500 Hz.

2. The device of claim 1, wherein the torque density is at least about 3.4 N-m/kg and the loss density is at most about 0.4 W/cm$^2$, the values of the torque density and the loss density being measured during continuous operation of the device as a generator connected to a resistive load and at a rotational speed providing electrical output at a frequency of at least about 750 Hz.

3. The device of claim 1, wherein the torque density is at least about 3.8 N-m/kg and the loss density is at most about 0.6 W/cm$^2$, the values of the torque density and the loss density being measured during continuous operation of the device as a generator connected to a resistive load and at a rotational speed providing electrical output at a frequency of at least about 1000 Hz.

4. The device of claim 1, wherein the torque density is at least about 6.0 N-m/kg and the loss density is at most about 0.4 W/cm$^2$, the values of the torque density and the loss density being measured during continuous operation of the device as a generator connected to a resistive load and at a rotational speed providing electrical output at a frequency of at least about 750 Hz.

5. The device of claim 1, wherein the torque density is at least about 8.0 N-m/kg and the loss density is at most about 0.6 W/cm$^2$, the values of the torque density and the loss density being measured during continuous operation of the device as a generator connected to a resistive load and at a rotational speed providing electrical output at a frequency of at least about 1000 Hz.

6. The device of claim 1, wherein the soft magnetic material is an advanced, low loss material characterized by a core loss less than "L" where L is given by the formula $L = 12 \cdot f \cdot B^{1.5} + 30 \cdot f^{2.3} \cdot B^{2.3}$, wherein L is the loss in W/kg, f is the frequency in kHz, and B is the peak magnetic flux density in Tesla.

7. The device of claim 6, wherein the advanced, low loss material is at least one material selected from the group consisting of amorphous metal, nanocrystalline metal, and optimized Fe-based alloy.

8. The device of claim 1, wherein the low loss soft magnetic material is amorphous metal.

9. The device of claim 1, wherein the low loss soft magnetic material is nanocrystalline metal.

10. The device of claim 1, wherein the low loss soft magnetic material is optimized Fe-based alloy.

11. The device of claim 1, wherein the device is an axial-airgap device.

12. The device of claim 11, having two stator assemblies and one magnetic field assembly therebetween.

13. The device of claim 1, wherein the magnetic core is a unitary magnetic core.

14. The device of claim 13, wherein the unitary magnetic core is also a unibody magnetic core.

15. The device of claim 1, wherein the device is a radial-airgap device.

16. The device of claim 1, adapted to operate continuously at a commutating frequency greater than about 500 Hz.

17. The device of claim 16, adapted to operate continuously at a commutating frequency ranging from about 500 Hz to 3 kHz.

18. The device of claim 17, adapted to operate continuously at a commutating frequency ranging from about 600 to 1200 Hz.

19. The device of claim 18, adapted to operate continuously at a commutating frequency of about 1000 Hz.

20. The device of claim 1, being an ambient air-cooled, closed-frame design and adapted to operate continuously at a rotational speed corresponding to a synchronous frequency of at least about 500 Hz with a temperature rise of at most 100° C. above ambient.

21. The device of claim 4, being a forced air-cooled design and adapted to operate continuously at a rotational speed corresponding to a synchronous frequency of at least about 750 Hz with a temperature rise of at most 100° C. above ambient.

22. The device of claim 5, being a liquid-cooled design and adapted to operate continuously at a rotational speed corresponding to a synchronous frequency of at least about 1000 Hz with a temperature rise of at most 100° C. above ambient.

23. The device of claim 1, wherein a slots per phase per pole ratio of the device ranges from about 0.25 to 4.0.

24. The device of claim 23, wherein the slots per phase per pole ratio of the device ranges from about 0.25 to 1.0.

25. The device of claim 24, wherein the slots per phase per pole ratio of the device is about 0.5.

26. The device of claim 1, wherein the plurality of rotor poles is at least 4 at speeds greater than about 12,000 revolutions per minute.

27. The device of claim 1, wherein the plurality of rotor poles is at least 16 poles.

28. The device of claim 1, wherein the plurality of rotor poles is at least 32 poles.

29. The device of claim 1, wherein the stator windings are adapted to be connected to three electrical phases.

30. The device of claim 1, wherein the magnetic field assembly is a rotor.

31. The device of claim 30, wherein the device is a brushless, permanent magnet DC machine.

32. A method of manufacturing a high efficiency, high power density permanent magnet electro-magnetic device comprising:

(a) selecting an advanced, low loss soft magnetic material that is characterized by a core loss less than "L" where L is given by the formula $$L = 12 \cdot f \cdot B^{1.5} + 30 \cdot f^{2.3} \cdot B^{2.3}, \text{ wherein}$$

L is the loss in W/kg, f is the frequency in kHz, and

B is the magnetic flux density in peak Tesla;

(b) providing at least one stator assembly including a magnetic core formed from the low-loss soft-magnetic material and having a plurality of slots;

(c) providing stator windings in the slots, the windings being adapted to be connected to at least one electrical phase; and (d) providing at least one magnetic field assembly, the at least one magnetic assembly including a plurality of rotor poles and a plurality of permanent magnets, the magnetic field assembly being arranged and disposed for magnetic interaction with the at least one stator assembly, the device providing a torque density of at least about 2.5 N-m/kg and a loss density of the device of at most about 0.2 W/cm$^2$, the values of the torque density and the loss density being measured during continuous operation of the device as a generator connected to a resistive load and at a rotational speed providing electrical output at a frequency of at least about 500 Hz.

33. The method of claim 32, wherein said electromagnetic device is an axial-airgap device.

34. The method of claim 32, wherein the plurality of rotor poles is greater than 4 at speeds greater than about 12,000 revolutions per minute.

35. The method of claim 32, wherein the plurality of rotor poles is at least 16 poles.

36. The method of claim 32, wherein the plurality of rotor poles is at least 32 poles.

37. The method of claim 32, wherein a slots per phase per pole ratio of the device ranges from about 0.25 to 4.0.

38. The method of claim 32, wherein the low loss soft magnetic material is amorphous metal.

39. The method of claim 32, wherein the low loss soft magnetic material is nanocrystalline metal.

40. The method of claim 32, wherein the low loss soft magnetic material is an optimized Fe-based alloy.

41. The method of claim 32, wherein the magnetic core is a unitary magnetic core.

42. The method of claim 41, wherein the magnetic core is also a unibody magnetic core.

43. A high efficiency, high power density permanent magnet electro-magnetic device system, comprising a high efficiency, high power density electro-magnetic device and power electronics means for interfacing and controlling said machine and being operably connected thereto, the electro-magnetic device comprising:

(a) at least one stator assembly including a magnetic core formed from a low-loss soft-magnetic material and having a plurality of slots wound with stator windings adapted to be connected to at least one electrical phase; and (b) at least one magnetic field assembly including a plurality of rotor poles, the magnetic field assembly comprising a plurality of permanent magnets and being arranged and disposed for magnetic interaction with the at least one stator assembly,
wherein a torque density of the device is at least about 2.5 N-m/kg and a loss density of the device is at most about 0.2 W/cm$^2$, the values of the torque density and the loss density being measured during continuous operation of the device as a generator connected to a resistive load and at a rotational speed providing electrical output at a frequency of at least about 500 Hz.

* * * * *